United States Patent
Small et al.

(10) Patent No.: US 10,691,258 B2
(45) Date of Patent: Jun. 23, 2020

(54) SYSTEMS AND METHODS FOR NOISE REDUCTION IN SENSORS

(71) Applicant: IDEX ASA, Fornebu (NO)

(72) Inventors: Jeffrey A Small, Rochester, NY (US); Kenneth Jeffrey Stern, Newton Lower Falls, MA (US); Imre Knausz, Fairport, NY (US)

(73) Assignee: IDEX Biometrics ASA, Oslo (NO)

( * ) Notice: Subject to any disclaimer, the term of this patent is extended or adjusted under 35 U.S.C. 154(b) by 178 days.

(21) Appl. No.: 15/869,214

(22) Filed: Jan. 12, 2018

(65) Prior Publication Data

US 2019/0220141 A1    Jul. 18, 2019

(51) Int. Cl.
| | | |
|---|---|---|
| *G06F 3/045* | (2006.01) | |
| *G06F 3/041* | (2006.01) | |
| *G06K 9/00* | (2006.01) | |
| *G06K 9/40* | (2006.01) | |
| *G06F 3/044* | (2006.01) | |

(52) U.S. Cl.
CPC .......... *G06F 3/0418* (2013.01); *G06F 3/044* (2013.01); *G06K 9/0004* (2013.01); *G06K 9/40* (2013.01); *G06F 2203/04107* (2013.01); *G06K 9/00013* (2013.01)

(58) Field of Classification Search
CPC ........ G06F 3/0418; G06F 3/041; G06F 3/044; G06F 2203/04107; G06K 9/00013; G06K 9/0004; G06K 9/40
See application file for complete search history.

(56) References Cited

U.S. PATENT DOCUMENTS

| | | |
|---|---|---|
| 7,188,132 B2 | 3/2007 | Nakayama |
| 7,868,874 B2 | 1/2011 | Reynolds |
| 8,314,351 B2 | 11/2012 | Reynolds |
| 8,338,724 B2 | 12/2012 | Reynolds |
| 8,487,891 B2 | 7/2013 | Oda et al. |
| 8,558,811 B2 | 10/2013 | Reynolds |
| 8,592,697 B2 | 11/2013 | Hotelling et al. |
| 8,593,423 B2 | 11/2013 | Hotelling et al. |
| 8,682,949 B2 | 3/2014 | Matsushima |
| 8,729,911 B2 | 5/2014 | Maharyta et al. |
| 8,730,197 B2 | 5/2014 | Hamaguchi et al. |
| 8,809,702 B2 | 8/2014 | Reynolds |

(Continued)

FOREIGN PATENT DOCUMENTS

| | | |
|---|---|---|
| CN | 102750056 A | 10/2012 |
| CN | 105830345 A | 8/2016 |

(Continued)

OTHER PUBLICATIONS

International Search Report and Written Opinion dated Apr. 11, 2019 issued in International Patent Appln No. PCT/IB2019/050034. (17 pages).

*Primary Examiner* — Vijay Shankar

(74) *Attorney, Agent, or Firm* — Rothwell, Figg, Ernst & Manbeck, P.C.

(57) ABSTRACT

Systems and methods for reducing noise in sensors are described. In some embodiments, measurement values for selected pixels may be processed to remove signals that are common to groups of pixels. In some embodiments, offset values between pixel groups may be determined. In some embodiments, the determined offset values may be used to remove or suppress artificial discontinuities.

25 Claims, 15 Drawing Sheets

(56) References Cited

U.S. PATENT DOCUMENTS

| | | | |
|---|---|---|---|
| 8,952,916 B2 | 2/2015 | Reynolds | |
| 8,970,544 B1 | 3/2015 | Mohindra | |
| 8,982,091 B1 | 3/2015 | Mohindra | |
| 9,012,793 B2 | 4/2015 | Reynolds | |
| 9,035,895 B2 | 5/2015 | Bussat et al. | |
| 9,069,408 B2 | 6/2015 | Hotelling et al. | |
| 9,176,621 B2 | 11/2015 | Lillie et al. | |
| 9,323,398 B2 | 4/2016 | Bernstein et al. | |
| 9,348,477 B2 | 5/2016 | Reynolds | |
| 9,430,097 B2 | 8/2016 | Worfolk | |
| 9,483,141 B2 | 11/2016 | Hotelling et al. | |
| 9,639,733 B2 | 5/2017 | Kremin et al. | |
| 9,696,863 B2 | 7/2017 | Reynolds | |
| 9,710,112 B2 | 7/2017 | Han | |
| 9,715,306 B2 | 7/2017 | Hotelling et al. | |
| 9,874,975 B2 * | 1/2018 | Benbasat | G06F 3/0418 |
| 9,996,175 B2 * | 6/2018 | Hotelling | G06F 1/3218 |
| 2010/0060591 A1 | 3/2010 | Yousefpor et al. | |
| 2012/0268142 A1 | 10/2012 | Kremin et al. | |
| 2014/0015774 A1 * | 1/2014 | Bussat | G06F 3/0418 345/173 |
| 2015/0077375 A1 | 3/2015 | Hotelling et al. | |
| 2016/0148034 A1 | 5/2016 | Kremin et al. | |
| 2016/0306467 A1 | 10/2016 | Reynolds | |
| 2016/0357344 A1 | 12/2016 | Benbasat et al. | |
| 2017/0322669 A1 | 11/2017 | Hotelling et al. | |
| 2017/0351897 A1 | 12/2017 | Kremin et al. | |

FOREIGN PATENT DOCUMENTS

| | | | |
|---|---|---|---|
| WO | 2012143752 A2 | 10/2012 | |
| WO | 2014021918 A1 | 2/2014 | |
| WO | 2016085560 A1 | 6/2016 | |

\* cited by examiner

SYSTEMS AND METHODS FOR NOISE REDUCTION IN SENSORS

FIELD OF THE DISCLOSURE

This disclosure relates to sensors for the electronic sensing of objects located near or about a sensor, such as a position of a finger or features thereof.

BACKGROUND

Sensors may be used for detecting the presence of objects located near or about a sensor. Such sensors can be configured to sense electronic characteristics of an object in order to sense presence or location of an object near or about the sensor, physical characteristics of the object, shapes, textures on surfaces of an object, material composition, biological information, and other features and characteristics of an object being sensed.

For some sensors, a portion of the body such as a finger may be positioned near or in contact with the sensor in order to perform a measurement. Because a body may function as an antenna and pick up electromagnetic radiation in the surrounding environment, the act of positioning a portion of a body near the sensor may generate noise that obscures the characteristic that is intended to be measured. Accordingly, there is a need for systems and methods to reduce or compensate for such noise.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

In a first aspect, a system for detecting a user's finger or other element may be provided. In some embodiments, the system may include a first plurality of lines, a second plurality of line arranged to intersect with the first plurality of lines, and a third plurality of lines arranged to intersect with the first plurality of lines. The first plurality of lines may include a first line and a second line, and each line in the first plurality of lines may be configured to apply or receive an electrical signal. The second plurality of lines may include a first line and a second line, and each line in the second plurality of lines may be configured to apply or receive an electrical signal. A set of the intersections between the first plurality of lines and the second plurality of lines may define a first pixel group including a plurality of pixels. The third plurality of lines may include a first line and a second line, and each line in the third plurality of lines being configured to apply or receive an electrical signal. A set of the intersections between the third plurality of lines and the first plurality of lines may define a second pixel group including a plurality of pixels.

In some embodiments, the system may further include a processor configured to modulate the electrical signals applied or received by each of the second plurality of lines according to a first pattern, and modulate the electrical signals applied or received by each of the lines of the third plurality of lines according to a second pattern. The processor may be configured to demodulate the modulated electrical signals applied or received by the second plurality of lines according to a third pattern, thereby determining a first set of relative values for the first pixel group, and demodulate the modulated electrical signals applied or received by the third plurality of pickup lines according to a fourth pattern, thereby determining a second set of relative values for the second pixel group. The processor may be further configured to compare a first value from the first set of relative values to a second value from the second set of relative values, and based on the comparing step, determine a first offset value indicating a difference between the first set of relative values and the second set of relative values. The processor may be configured to compensate for the difference between the first set of relative values and the second set of relative values based on the determined first offset value.

In some embodiments, the comparing step may be performed under conditions whereby a difference between the first value and the second value is expected to be approximately zero in the absence of a nonzero first offset value. In some embodiments, the first pattern may include n timeslots, and for each of the n timeslots, an array of modulation factors corresponding to the respective timeslot may sum to substantially zero. In some embodiments, the first pixel group and the second pixel group may share a common pixel. In some embodiments, the first value may correspond to the common pixel, and the second value corresponds to the common pixel.

In some embodiments, a fourth plurality of lines may be arranged to intersect with the second plurality of lines. The fourth plurality of lines may include a first line and a second line, and each line in the second plurality of lines being configured to apply or receive an electrical signal. A set of the intersections between the fourth plurality of lines and the second plurality of lines may define a third pixel group including a plurality of pixels. In some embodiments, the processor may be further configured to determine a third set of relative values for the third pixel group. In some embodiments, the processor may be further configured to determine a second offset value indicating a difference between the first set of relative values and the third set of relative values, and based on the determined first offset value, compensate for the difference between the first set of relative values and the third set of relative values.

In some embodiments, the first plurality of lines and the fourth plurality of lines may share a common line. In some embodiments, at a first time, during which the electrical signals applied or received by each of the second plurality of lines are modulated according to the first pattern, each of the second plurality of lines may be one of (i) drive lines and (ii) pickup lines. At a second time, during which electrical signals applied or received by each of the fourth plurality of lines are modulated, each of the second plurality of lines may be the other of (i) drive lines and (ii) pickup lines.

In some embodiments, the system may include a first row of pixels and a second row of pixels. The processor may be further configured to determine a set of relative values for the first pixel row, and determine a set of relative values for the second pixel row. In some embodiments, the processor may be further configured to determine a row offset value which substantially maximizes a correlation between the set of relative values for the first pixel row and the set of relative values for the second pixel row. In some embodiments, the processor may be further configured to compensate for a difference between the set of relative values for the first pixel row and the set of relative values for the second pixel row based on the determined row offset value. In some embodiments, the first pixel row may include the first pixel group and the second pixel group.

In some embodiments, the first set of relative values may include a first relative value corresponding to a first pixel and a second relative value corresponding to a second pixel. The processor may be further configured to determine a first absolute value corresponding to the first pixel, and based on the determined first absolute value, the first relative value, and/or the second relative value, determine a second absolute value corresponding to the second pixel. In some embodiments, determining the first absolute value may include modulating electrical signals applied or received by each of a fifth plurality of lines according to a fifth pattern, and demodulating the modulated electrical signals applied or received by the fifth plurality of lines according to a sixth pattern, thereby determining a set of absolute values. The fifth plurality of lines may include a first line and a second line, and the first line of the second plurality of lines may be the same line as the first line of the fifth plurality of lines. The set of absolute values may include the first absolute value.

In some embodiments, an electrical isolator may be disposed at a position proximate a first pixel of the first pixel group. The isolator may be arranged to isolate a pickup line from a signal applied by a drive line.

In some embodiments, the system may include a sixth plurality of lines arranged to intersect with the first plurality of lines. The sixth plurality of lines may include a first line and a second line, and each line in the sixth plurality of lines may be configured to apply or receive an electrical signal. A set of the intersections between the second plurality of lines and the sixth plurality of lines may define a fourth pixel group including a plurality of pixels. The processor may be further configured to modulate the electrical signals applied or received by the sixth plurality of lines according to the first pattern, and demodulate the modulated electrical signals from the sixth plurality of lines according to the third pattern, thereby determining a fourth set of relative values for the fourth pixel group. The processor may be further configured to determine a third offset value indicating a difference between the fourth set of relative values and at least one of the first set of relative values and the third set of relative values, the third offset value being determined by comparing a value from the fourth set of relative values to a value from the first and/or third set of relative values. The processor may be further configured to compensate for the difference between the fourth set of relative values and at least one of the first and/or third set of relative values based on the determined third offset value.

In some embodiments, the system may include a seventh plurality of lines arranged to intersect with the first plurality of lines. The seventh plurality of lines may include a first line and a second line, each line in the seventh plurality of lines being configured to apply or receive an electrical signal. A set of the intersections between the first plurality of lines and the seventh plurality of lines may define a fifth pixel group including a plurality of pixels. The processor is further configured to modulate the electrical signals applied or received by the seventh plurality of lines according to a seventh pattern, and demodulate the modulated electrical signals from the seventh plurality of lines according to an eighth pattern, thereby determining a fifth set of relative values for the fifth pixel group. The processor may be further configured to determine a fourth offset value indicating a difference between the fifth set of relative values and at least one of the first set of relative values and the second set of relative values, the fourth offset value being determined by comparing a value from the fifth set of relative values to a value from the first and/or second set of relative values. The processor may be further configured to compensate for the difference between the fifth set of relative values and at least one of the first and/or second set of relative values based on the determined fourth offset value.

In some embodiments, the second plurality of lines, the third plurality of lines, and the seventh plurality of lines may share a common line, the first line of the second plurality of lines, the first line of the third plurality of lines, and the first line of the seventh plurality of lines being the common line.

In some embodiments, the second plurality of lines and the third plurality of lines may share a first common line, the first line of the second plurality of lines and the first line of the third plurality of lines being the first common line. In some embodiments, the third plurality of lines and the seventh plurality of lines may share a second common line, the second line of the third plurality of lines and the first line of the seventh plurality of lines being the second common line.

In some embodiments, the processor may be further configured to determine the first offset value by comparing the first value from the first set of relative values, the first value corresponding to a pixel along the first common line, to a second value from the second set of relative values, the second value corresponding to the pixel along the first common line. The processor may be further configured to determine the fourth offset value by comparing a third value from the second set of relative values, the third value corresponding to a pixel along the second common line, to a fourth value from the fifth set of relative values, the fourth value corresponding to the pixel along the second common line.

In a second aspect, a system for detecting a user's finger or other element may be provided. In some embodiments, the system may include a first plurality of lines and a second plurality of lines arranged to intersect with the first plurality of lines. The first plurality of lines may include a first line and a second line, and each drive line in the first plurality of lines may be configured to apply or receive an electrical signal. The second plurality of lines may include a first line and a second line, and each line in the second plurality of lines may be configured to apply or receive an electrical signal. A set of the intersections between the first plurality of lines and the second plurality of lines may define a first pixel group including a plurality of pixels. The system may include a processor that is configured to modulate the electrical signals applied or received by each of the second plurality of lines according to a first pattern. In some embodiments, the processor may be configured to demodulate the modulated electrical signals applied or received by the second plurality of lines according to a second pattern, thereby determining a first set of relative values for the first pixel group. The first set of relative values may include a first relative value corresponding to a first pixel and a second relative value corresponding to a second pixel. The processor may be configured to determine a first absolute value corresponding to the first pixel. The processor may be configured to determine a second absolute value corresponding to the second pixel based on the determined first absolute value, the first relative value, and/or the second relative value.

In some embodiments, determining the first absolute value may include modulating electrical signals applied or received by each line of a third plurality of lines according to a third pattern. The third plurality of lines may include a first line and a second line, and the first line of the second plurality of lines may be the same line as the first line of the third plurality of lines. A set of the intersections between the first plurality of lines and the third plurality of lines may define a second pixel group including a plurality of pixels. The processor may be further configured to demodulate the modulated electrical signals applied or received by the second plurality of pickup lines according to a fourth pattern, thereby determining a set of absolute values. The set of absolute values may include the first absolute value.

In some embodiments, the third pattern may include m time slots, and for at least one of the m timeslots, an array of modulation factors corresponding to the at least one timeslot may sum to value that is not substantially zero. In some embodiments, the first pattern may include n timeslots, and for each of the n timeslots, an array of modulation factors corresponding to the respective timeslot may sum to substantially zero.

In some embodiments, an electrical isolator may be disposed at a position proximate the first pixel. In some embodiments, the isolator being arranged to isolate a pickup line from a signal applied by a drive line.

In a third aspect, a system for detecting a user's finger or other element may be provided. In some embodiments, the system may include a first plurality of pixels and a second plurality of pixels. The first plurality of pixels may include a first pixel and a second pixel, and the second plurality of pixels may include a first pixel and a second pixel. The system may include a processor configured to determine a first set of relative values corresponding to the first plurality of pixels. The processor may be configured to determine a second set of relative values corresponding to the second plurality of pixels. The processor may be configured to compare a first value from the first set of relative values to a second value from the second set of relative values, and based on the comparing step, determine a first offset value indicating a difference between the first set of relative values and the second set of relative values. The processor may be configured to compensate for the difference between the first set of relative values and the second set of relative values based on the determined first offset value.

In some embodiments, the comparing step may be performed under conditions whereby a difference between the first value and the second value is expected to be approximately zero in the absence of a nonzero first offset value.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DETAILED DESCRIPTION

Figure 1:
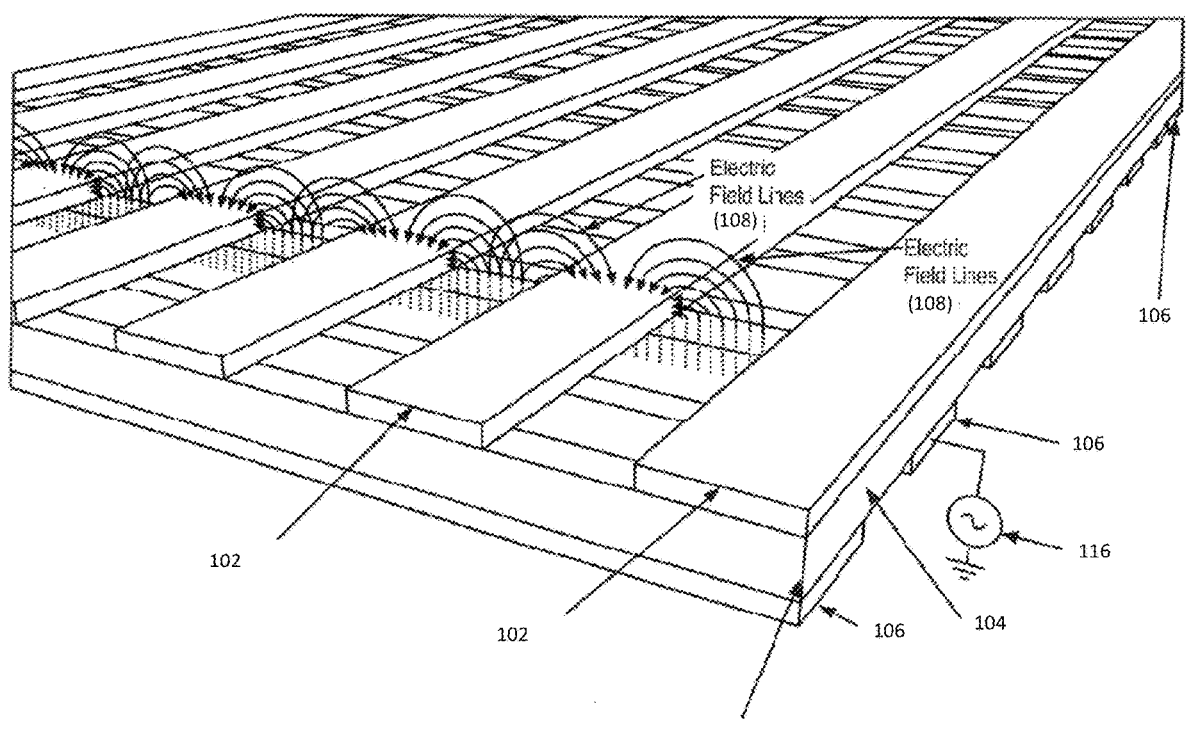
FIG. 1 is a perspective view of an exemplary sensor.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "substantially" and "substantial" refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

As used herein, the terms "optional" and "optionally" mean that the subsequently described, component, structure, element, event, circumstance, characteristic, property, etc. may or may not be included or occur and that the description includes instances where the component, structure, element, event, circumstance, characteristic, property, etc. is included or occurs and instances in which it is not or does not.

As used herein, the term "noise" broadly includes disturbances generated by any of various random processes (e.g., flicker noise, shot noise) and also to interference that is substantially not correlated with the signals being acquired nor with the acquisition method.

As used herein, the term "array" broadly includes structured or unstructured data which may be defined, without limitation, along any number of dimensions.

The present disclosure may be incorporated into any suitable sensor, as will be understood by those of skill in the art. Such exemplary sensors may include touch screens, fingerprint sensors, or other sensors configured to detect the position of an object or feature thereof. For purposes of illustration, and not by way of limitation, the disclosure below discusses embodiments of two-dimensional sensors configured to detect the location of a user's finger or portion thereof. In some embodiments, exemplary sensors may include the general structure described in U.S. Pat. No. 8,421,890, which is incorporated herein by reference in its entirety.

In sensors such as touch screens and fingerprint sensors, a user's finger may come in contact or close proximity to the sensor during operation of the sensor. A human body can function like an antenna and pick up electromagnetic radiation or noise from the surrounding environment. This noise can propagate through the body to the finger at a position proximate the sensor, which may interfere with signals being detected by the sensor. In the case of fingerprint sensors, for example, this interfering signal may have the same order of magnitude as the signal difference between a ridge and a valley on a fingerprint that is being measured. This noise can therefore pose a substantial obstacle to accurate measurement and analysis of the fingerprint. Other sources of noise also exist. As one example, power supply noise can be conducted into a sensor through the capacitive connection of the human body to a different ground potential than the sensor.

It is therefore desirable to minimize noise in sensors. For example, in U.S. Pat. No. 9,779,280, which is incorporated by reference herein in its entirety, a system combining reference and compensation electrodes with differential amplifiers is used to improve the rejection of typical conducted and radiated noise sources found in sensors such as fingerprint sensors. Other strategies for managing or reducing noise are disclosed herein.

FIG. 1 depicts an exemplary embodiment of a sensor 100. The sensor 100 may include a plurality of pickup lines 102 disposed along a top surface of an insulating layer 104. In some embodiments, the insulating layer 104 may include a dielectric substrate. The sensor may further include a plurality of drive lines 106. The drive lines 106 may be arranged to intersect one or more of the pickup lines. In some embodiments, the drive lines 106 may be oriented perpendicularly relative to the pickup lines. Each of the drive lines 106 may be operatively coupled to a power source 116 and configured to apply an electrical signal in an area surrounding the respective drive line 106. For example, the drive lines may be configured to apply an electric field including electric field lines 108 as illustrated in FIG. 1.

In some embodiments, one or more (or each) of the pickup lines 102 may be configured to receive an electrical signal and transmit the received signal into circuitry proximate the respective pickup line 102. In some embodiments, the pickup lines 102 may be configured to receive electromagnetic fields applied by the drive lines 106, subject to any modification of the electric field caused by, for example, the presence of an object placed within the range of the electric fields. In this manner, a pickup line 102 may be configured to receive electrical signals containing an indication as to whether an object or component thereof is within range of the electrical field received by the respective pickup line 102.

In some embodiments, the drive lines 106 and pickup lines 102 may be arranged in a grid whereby each intersection (which may also be referred to herein as a pixel) of a respective drive line and pickup line may function as a sensor configured to output a signal containing an indication as to whether an object is in range of the electric field received by the respective pickup line. As will be discussed in greater detail below, the information from each intersection may be collected and processed to determine the location of an object or features thereof across a two-dimensional sensor surface.

Note that other sensor embodiments may be equivalently used and combined with the disclosure herein, and the above description should not be construed as limiting in any way. For example, self- or absolute-capacitance sensors, as well as mutual capacitance, or self-capacitance sensors may be equivalently used with the processing techniques and technical approaches discussed herein.

Figure 2:
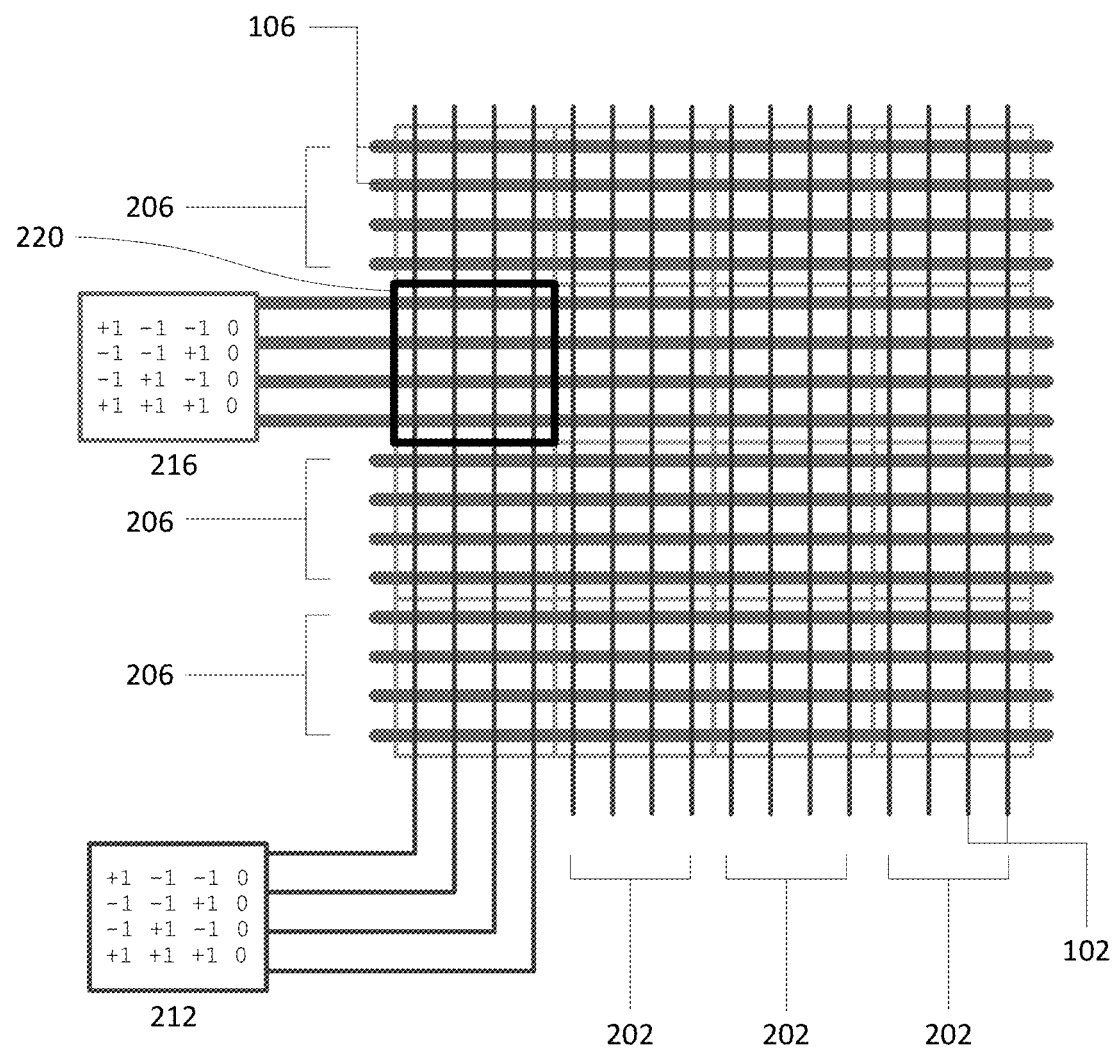
FIGS. 2 and 3 depict schematic views for exemplary sensor grids.

FIG. 2 illustrates an exemplary schematic diagram of a 2-dimensional grid comprised of intersecting pickup lines 102 and drive lines 106. As illustrated in this exemplary embodiment, a number of pickup lines 102 may be organized into pickup line groups 202, and a number of drive lines 106 may be organized into drive line groups 206. In the illustrated embodiment, each pickup line group 202 includes four pickup lines, and each drive line group 206 includes four drive lines 206. As will be understood, however, groups of different numbers could be used, and the group size can be varied across the sensor surface. In some embodiments, the pickup line and/or drive line groups can include three, four, five, six, seven, eight, nine, ten, eleven, twelve, or more pickup lines or drive lines per respective group.

As explained above, each intersection of a drive line and a pickup line may function as a sensing unit (e.g., a pixel) configured to detect the presence of an object or feature thereof in a localized region surrounding that respective intersection. In some embodiments where both drive lines 106 and pickup lines 102 are organized into respective groups 206, 202, a two-dimensional sensor grid may be logically segmented into localized sensor regions 220 of intersecting drive line and pickup line groups 206, 202. For example, in an embodiment where the drive line groups 206 and pickup line groups 202 are each comprised of n lines, a region 220 may be an n×n matrix of sensor pixels. It should be noted that the organization of groups and/or regions can be accomplished via software, firmware, hardware, or any combination of the above. In some embodiments, pixels belonging to a given region may be interleaved with those of another region. For example, in an embodiment in which matrices of size four are used, pixels may progress along a given line according to the following pattern: region 1, pixel 1; region 2, pixel 1; region 3, pixel 1; region 4, pixel 1; region 1, pixel 2; region 2, pixel 2, and so on. Such interleaving may be performed along one or two dimensions simultaneously. Interleaving may advantageously reduce electrical interference between, for example, neighboring signal lines. This reduction in interference may also benefit other transducer systems, including those without signal lines.

Also illustrated in FIG. 2 are exemplary modulation patterns 212, 216. In some embodiments, a modulation pattern may be a two-dimensional matrix in which the arrays lying along one dimension (e.g., each column) represent time slots, and the arrays lying along the other dimension (e.g., each row) represent values (e.g., modulation factors) indicating how a signal applied by or received by a respective line 106, 102 should be modulated (e.g., by shifting phase, modifying polarity, switching the signal on/off) within the respective timeslot.

In the illustrated embodiment, for example, a pattern 212 is configured to modulate (or "encode") the signals received by the pickup lines 102 within a selected pickup line group 202. The exemplary pattern 212 is a 4×4 matrix consisting of values +1, −1, and 0. In this embodiment, each column represents a time slot, and each row represents modulation values for one of the pickup lines 102 within the pickup line group 202 that is to be modulated according to the pattern 212. For each timeslot, a 0° phase shift may applied to the signals received by the pickup lines corresponding to +1's in the matrix, a 180° phase shift may be applied to the signals received by the pickup lines corresponding to −1's in the matrix, and no signal may be received (e.g., any received signal may be ignored or canceled) by the pickup lines corresponding to 0's in the matrix.

Similarly, in the exemplary embodiment illustrated in FIG. 2, a pattern 216 is configured to modulate the signals applied by the drive lines 106 within a selected drive line group 206. The exemplary pattern 216 is a 4×4 matrix consisting of values +1, −1, and 0. In this embodiment, each column represents a time slot, and each row represents modulation values for one of the drive lines 106 within the drive line group 206 that is to be modulated according to the pattern 216. For each timeslot, a 0° phase shift may applied to the signals transmitted by the drive lines corresponding to +1's in the matrix, a 180° phase shift may be applied to the signals transmitted by the drive lines corresponding to −1's in the matrix, and no signal may be transmitted by the pickup lines corresponding to 0's in the matrix.

Both signals applied by the drive lines 102 and signals received by the pickup lines 106 may be modulated. In some embodiments, the drive lines 102 may be connected to a power supply that supplies a carrier signal. In some embodiments, a processor in the sensor may control the modulation of the signal supplied to one, some, or all of the drive lines 102. In a similar fashion, the signals received by the pickup lines 106 may be modulated. In some embodiments, one or more differential amplifiers may be operatively connected to one or more of the pickup lines such that pickup lines associated with a +1 modulation factor in a given timeslot may be connected to a positive input of an amplifier and pickup lines associated with a −1 modulation factor in a given timeslots may be connected to a negative input of an amplifier. In some embodiments, pickup lines that are associated with a modulation factor of 0 in a given timeslot may have no connection to an amplifier or other receiver during the respective timeslot. Other embodiments for modulating the signals applied or received by the drive and pickup lines may be employed without departing from the scope of the instant disclosure.

Although FIG. 2 depicts patterns 212, 216 respectively modulating a single pickup line group 202 and a single drive line group 206, any number of groups 202, 206 may be modulated. In some embodiments, one, some, or all of the pickup line groups 202 may be modulated according to one or more patterns 212. Likewise, in some embodiments, one, some, or all of the drive line groups 206 may be modulated according to one or more patterns 216. Further, both pickup line groups 202 and drive line groups 206 may be modulated in some embodiments, and in other embodiments, only pickup line groups 202 or only drive line groups 206 may be modulated. In still other embodiments, no modulation is applied at all.

In some embodiments, one, some, or all of the rows within patterns 212, 216 may be substantially mathematically orthogonal to one, some, or all of the other rows within patterns 212, 216. In some embodiments, one, some, or all of the patterns 212, 216 may include Hadamard, Legendre, Barker sequences, modifications of these sequences, or other suitable code division multiplexing matrices. In some embodiments, one, some or all of the patterns 212, 216 may be "balanced" such that for each of the timeslots in the respective pattern, an array of modulation factors corresponding to the respective timeslot (e.g., the values in a given column) sums to substantially zero. For purposes of illustration, an exemplary balanced $4^{th}$-order pseudo-orthogonal pattern is reproduced below:

+1 −1 −1 0
−1 −1 +1 0
−1 +1 −1 0
+1 +1 +1 0

In the above exemplary pattern, the values in each column sum to zero. Additionally, because the values in the right-most column are all 0's, the signals that are applied or received in this timeslot may convey no information and may optionally not be acquired and/or processed. Of course, other suitable patterns may be selected, as will be understood by those of skill in the art.

In embodiments where a modulation pattern is applied to one or both of a given drive line group 206 and pickup line group 202, the signals received for the sensor region 202 defined at the intersection thereof may be demodulated by using one or more additional patterns. Exemplary demodulation or "decode" patterns may include Hadamard, Legendre, Barker sequences, modifications (e.g., inverses) of these sequences, or other suitable code division multiplexing matrices and modifications thereof. An exemplary decode pattern is reproduced below.

+1 −1 −1 +1
−1 −1 +1 +1
−1 +1 −1 +1
+1 +1 +1 +1

Although the above exemplary patterns are $4^{th}$ order matrices, this disclosure should not be construed as limiting, as any suitable pattern may be used. Additionally, modulation may be used simultaneously on both the drive lines and receive lines. Such embodiments may utilize substantially orthogonal modulation patterns such that the modulated signals may be mathematically separated from one-another.

In some embodiments, transmitter power may be a linear function of the matrix order, so using lower order matrices on the drive lines may be desirable. In some embodiments, common-mode noise at the receiver may increase and the Q of a connected resonant circuit (as used in some receiver circuits) may decrease as the number of connected pickup lines increases. For these reasons, it may be desirable to use low order matrices to modulate the signals received from the pickup lines. It may be beneficial to attain a given signal-to-noise reduction by using relatively low-order matrices on both the drive lines and pickup lines rather than using higher-order matrices on one side. In some embodiments, matrices of the following orders may be used: second-order, third-order, fourth-order, fifth-order, sixth-order, seventh-order, eighth-order, ninth-order, tenth-order, eleventh-order, twelfth-order, or up to twentieth-order. In some embodiments, higher-order matrices may be used.

The mathematical interaction of the above exemplary encode pattern and the above exemplary decode pattern is shown below to aid in explaining how measurement values may be extracted through the use of such patterns.

Define: $[abcd]$=array containing four pixel values (one for each drive line in a given group) to be encoded $[abcd]*[\text{Encode Matrix}]=[efgh]$=received array $[efgh]*[\text{Decode Matrix}]=[a'b'c'd']$=reconstructed array Thus, $[abcd]*[\text{Encode Matrix}]*[\text{Decode Matrix}]= [a'b'c'd']$ Taking the above-referenced exemplary encode and decode matrices, it is observed that:

$[\text{Encode Matrix}]*[\text{Decode Matrix}]=4*\text{Identity Matrix}-1*\text{Unit Matrix}$ Thus, this exemplary system has a gain of four due to the "4*Identity Matrix" term, but it is missing the average value due to the "−1*Unit Matrix" term:

$a'=4a-(a+b+c+d)$ $b'=4b-(a+b+c+d)$ $c'=4c-(a+b+c+d)$ $d'=4d-(a+b+c+d)$

In this exemplary system, the original values may be reconstructed by dividing [a' b' c' d'] by four (which may beneficially reduce noise) and then adding back in the average of the original values. During reconstruction, however, this average value may be unknown. The absence of average values can obscure the relationships between the localized regions 220 across the sensor surface. The disclosure below sets forth several technical approaches that can be used to restore the average values and/or to determine relationships between localized regions 220.

Before turning to these technical approaches, it is worth noting how the above processing steps operate to manage or reduce noise. Noise from many sources, including radiation noise that is caused by the body (e.g., a finger) acting as an antenna, may be distributed substantially uniformly across regions of a sensor. In embodiments where the sensor surface is segmented into localized regions 220, the noise received at each pixel in a respective region 220 may be substantially equal to the noise received at each of the other pixels within the region 220. The above-discussed modulation and demodulation techniques, which can be optionally used in combination with a differential signal path, may result in the noise appearing to be substantially equivalent on both positive and negative signal processing inputs. Thus, the noise may manifest as common mode noise, which may be substantially cancelled by a differential signal path.

Additionally, these processing techniques can beneficially reduce the dynamic range of the received signal, thereby allowing the dynamic range to be completely utilized for detection of measurement signals. For example, in some embodiments, one or more drive lines may apply a carrier signal. Where the carrier is a common signal (for example, where each pickup line of a given pickup line group receive signals applied by a common drive line), the carrier signal is substantially cancelled by the above processing techniques. In some embodiments, the magnitude of the measurement signal (i.e., the signal modification resulting from an object such as a finger being placed in close proximity to the sensor) is much smaller than that of the carrier signal. For example, in a system where local regions of four lines are used and where the magnitude of the measurement signal is 5% of the magnitude of the carrier signal, the dynamic range of the received signal is 4*5%=20%. In this example, the resulting dynamic range required to receive the measurement signal is thus just one fifth of the carrier amplitude, which allows the receiver gain to be made five times greater than the gain could be otherwise.

Figure 3:
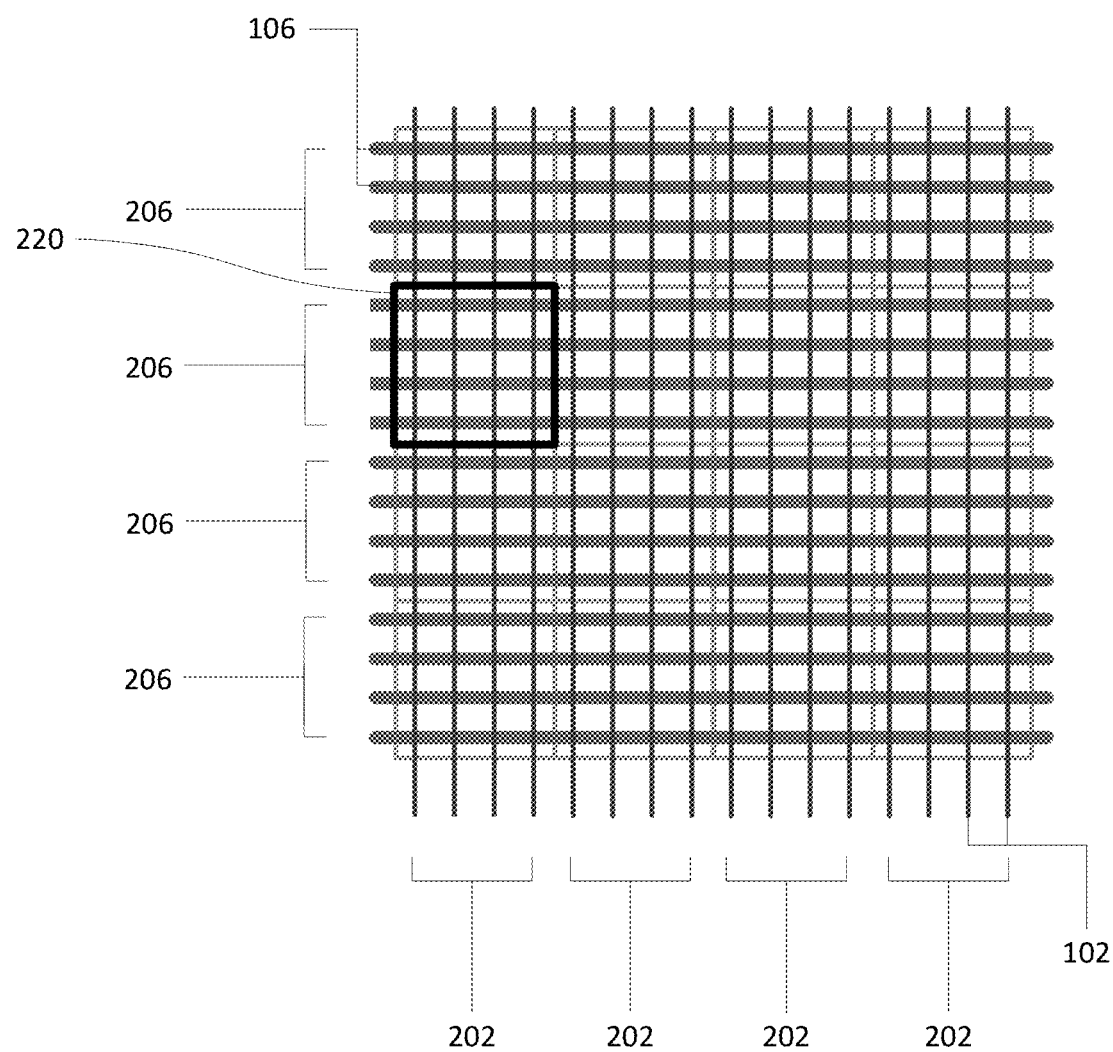

FIG. 3 illustrates another exemplary embodiment for achieving the above benefits. The exemplary embodiment illustrated in FIG. 3 differs from that of FIG. 2 in that modulation and demodulation patterns are not used. Instead, common mode signals may be subtracted via other techniques, such as by computationally isolating and subtracting common mode signals from pixel groups. These techniques may remove average values from pixel measurements and thereby obscure the relationships between the localized regions 220 across the sensor surface. The technical approaches described below for determining these relationships may also be used in combination with embodiments such as that illustrated in FIG. 3.

FIGS. 4-11 and 13-15 illustrate exemplary technical approaches and methods that can be used to determine the average signal values within a given line group or region of the sensor, and/or to determine relationships between line groups or localized regions of the sensor. For example, the approaches illustrated in FIGS. 4-11 and 13-15 can be used to determine offset values between pixel groups and/or regions of a sensor. Any one or more of the embodiments illustrated in FIGS. 4-11 and 13-15 can be combined with any one or more of the embodiments described above, including the exemplary embodiments described with reference to FIGS. 1-3.

Figure 4:
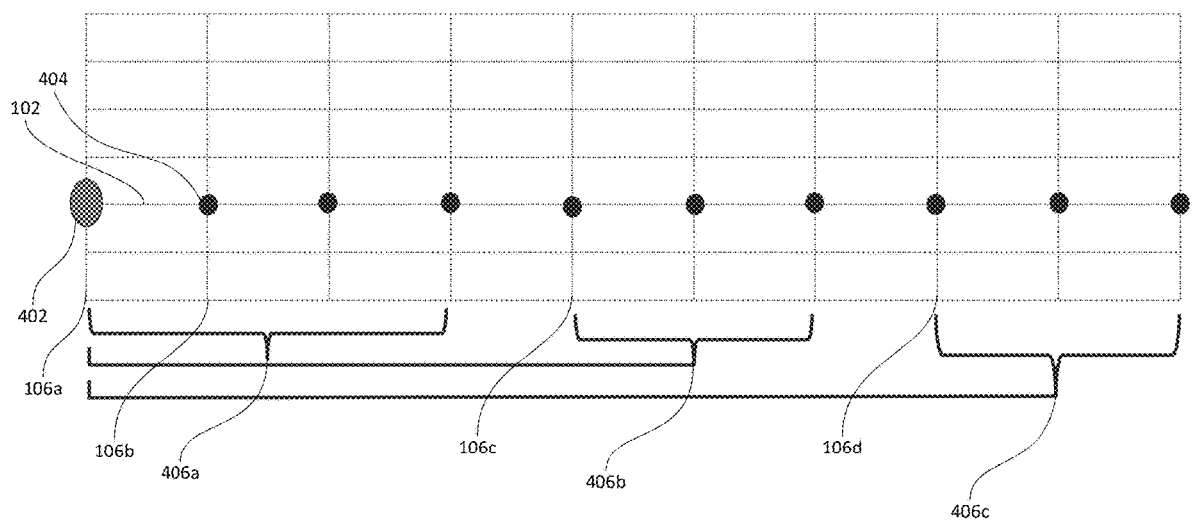
FIGS. 4-6 illustrate exemplary embodiments for determining pixel values using common pixels.
Figure 5:
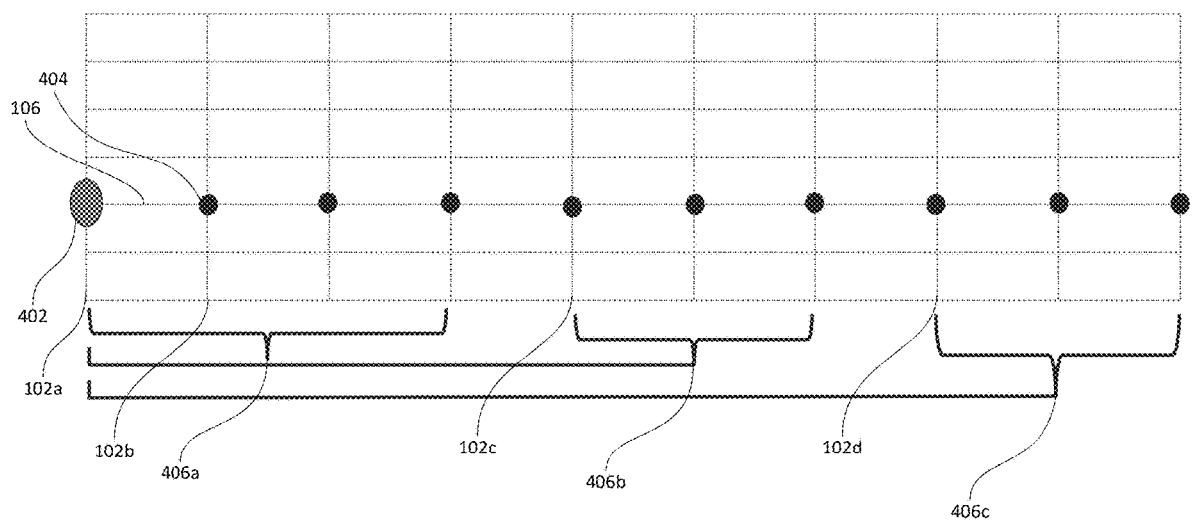

FIGS. 4 and 5 illustrate exemplary embodiments in which some number of pixel groups 406a-406c (which may in some embodiments correspond to pickup line groups or drive line groups) share a common pixel 402. For example, a first pixel group 406a may include the common pixel 402 and one or more other pixels 404. A second pixel group 406b may include the common pixel 402 and one or more other pixels 404. A third pixel group 406c may include the common pixel 402 and one or more other pixels 404. In some embodiments, the pixel groups 406a, 406b, 406c may be disposed on a common line of the sensor, and in other embodiments, one or more of the pixel groups 406a, 406b, 406c may be disposed on a different line of the sensor than one or more other pixel groups with which the respective pixel group shares a common pixel.

As illustrated in FIG. 4, the organization of pixels into groups 406a, 406b, 406c may in some embodiments be accomplished by using a common drive line 102 that intersects multiple pickup line groups. For example, the illustrated pixels 402, 404 may correspond to intersections between a drive line 102 and a plurality of pickup lines 106a-106d. In some embodiments, a first pickup line group may include the common pickup line 106a and at least another pickup line 106b, and a second pickup line group may include the common pickup line 106a and at least another pickup line 106c. In some embodiments, a third pickup line group may include the common pickup line 106a and at least another pickup line 106d.

As illustrated in FIG. 5, the organization of pixels into groups 406a, 406b, 406c may in some embodiments be accomplished by using a common pickup line 106 that intersects multiple drive line groups. For example, the illustrated pixels 402, 404 may correspond to intersections between a plurality of drive lines 102a-102d and a pickup line 106. In some embodiments, a first drive line group may include the common drive line 102a and at least another drive line 102b, and a second drive line group may include the common drive line 102a and at least another drive line 102c. In some embodiments, a third drive line group may include the common drive line 102a and at least another drive line 102d.

Thus, in the embodiments illustrated in FIGS. 4 and 5, a common pixel may be included in multiple pixel groups. These pixel groups may represent regions of the sensor or line segments within regions of the sensor.

As discussed above, the processing techniques discussed with reference to FIGS. 2 and 3 may remove the average values from signals obtained from line groups and thereby obscure the relationships between regions of the sensor. The use of common pixels across multiple pixel groups as illustrated in FIGS. 4 and 5 permits these relationships to be determined. For example, after the signals are processed such that the average value for a given pixel group has been removed, the signals received from each pixel group 406a-406c may be modified (e.g., by adding or subtracting from each of the values in a respective pixel group) so that for each pixel group, the common pixel 402 in each group has the same value. For example, an offset value between two groups may be determined because it is known that in the absence of such offset, the common pixel would have the same output value. Compensating for the determined offset may thereby align the average value of each pixel group with those of its adjacent pixel groups. Note that this approach aligns values of the pixel groups relative to one another, but may not necessarily produce pixel values that are accurate in an absolute sense (e.g., true values). Nevertheless, the resulting line of pixel values can be used for determining the position of an object or features thereof since artificial discontinuities will be eliminated or reduced.

The approach illustrated in FIGS. 4 and 5 utilizes data collection and processing resources in an efficient manner. For example, in embodiments where pseudo-orthogonal matrices are used for encoding (e.g., Hadamard matrices where the column of all ones is skipped), an Nth order matrix requires just (N−1) timeslots, and reconstructs the common pixel plus (N−1) new pixels. Thus, each timeslot reconstructs exactly one pixel. There may therefore be no additional cost (in number of timeslots) to include the common pixel. Other encode and decode matrices can similarly be selected to deliver high processing efficiency.

Figure 6:
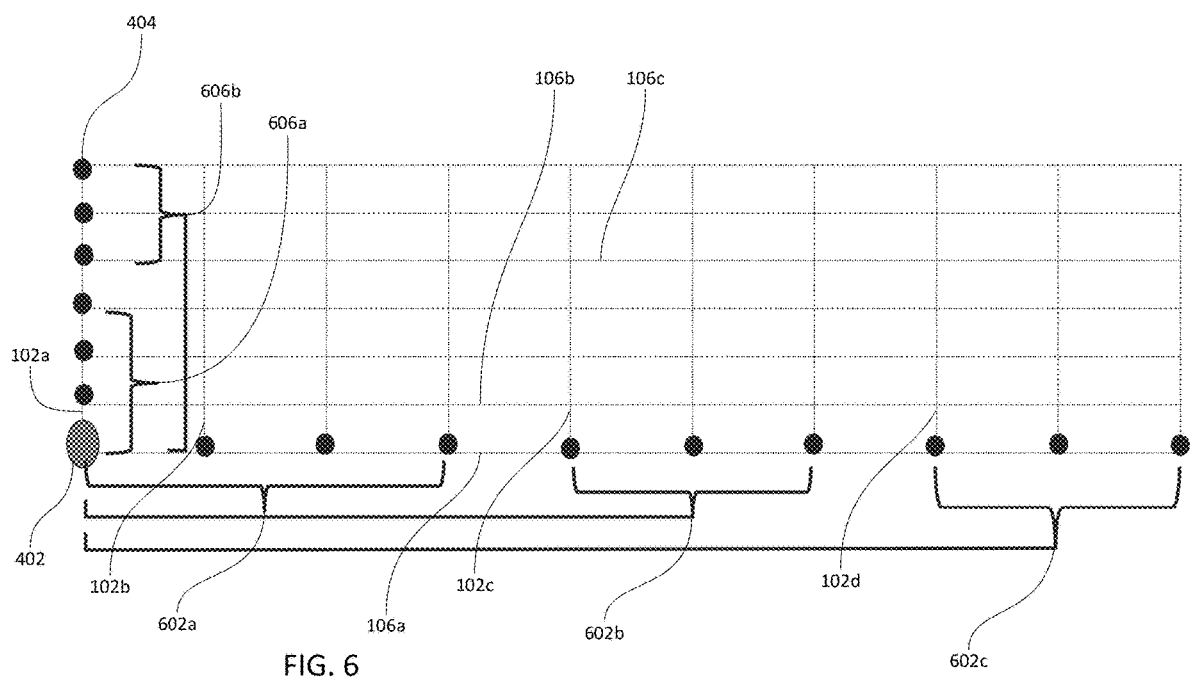

FIG. 6 depicts an exemplary embodiment in which pixel groups 602a-602c, 606a-606b may be disposed along two dimensions and may share a common pixel 402. In the illustrated embodiment, a single common pixel 402 is shared among pixel groups extending in both dimensions. In other embodiments, however, different pixels may be selected as a common pixel among pixel groups extending along different dimensions. In some embodiments, a first pixel group 602a disposed along the first dimension may include a common pixel 402 and one or more other pixels 404. A second pixel group 602b disposed along the first dimension may include the common pixel 402 and one or more other pixels 404. A third pixel group 406c may include the common pixel 402 and one or more other pixels 404. In some embodiments, a fourth pixel group 606a, which may be disposed along the second dimension, may include a common pixel 402 and one or more other pixels 404. A fifth pixel group 606b, which may be disposed along the second dimension, may include a common pixel and one or more other pixels 404. More pixel groups (e.g., six, seventh, eight, and so on) may be provided along either dimension to extend the system as far as may be desired. Additionally, the pixel groups sharing a common pixel may lie along a common line of the sensor. Alternatively, these pixels may be disposed along different lines. In some embodiments, each pixel group may be modulated and demodulated as described above using respective patterns. In some embodiments, relative values may instead be calculated as discussed with respect to FIG. 3.

The organization of pixels into groups 602a-602c, which may be disposed along the first dimension, may in some embodiments be accomplished by using a common pickup line 106a that intersects multiple drive line groups. For example, the illustrated pixels 402, 404 belonging to pixel groups 602a-602c may correspond to intersections between a plurality of drive lines 102a-102d and a pickup line 106a. In some embodiments, a first drive line group may include the common drive line 102a and at least another drive line 102b, and a second drive line group may include the common drive line 102a and at least another drive line 102c. In some embodiments, a third drive line group may include the common drive line 102a and at least another drive line 102d.

The organization of pixels into groups 606a-602c, which may be disposed along the second dimension, may in some embodiments be accomplished by using a common drive line 102a that intersects multiple pickup line groups. For example, the illustrated pixels 402, 404 belonging to pixel groups 606a-606b may correspond to intersections between a drive line 102a and a plurality of pickup lines 106a-106c. In some embodiments, a first pickup line group may include the common pickup line 106a and at least another pickup line 106b, and a second pickup line group may include the common pickup line 106a and at least another pickup line 106c. In some embodiments, a third pickup line group may include the common pickup line 106a and at least another pickup line 106d (see FIG. 4). As will be understood by those of skill in the art, the embodiment illustrated in FIG. 6 extends the approaches illustrated in FIGS. 4 and 5 along two dimensions simultaneously.

In some embodiments where pixel groups are disposed along two dimensions, a processor may perform modulation and demodulation to obtain relative and offset values as described above along both dimensions. For example, in some embodiments, relative pixel values and offset values may be determined along a first dimension (e.g., pixel groups 602a, 602b, 602c) using the common pixel approach described in FIGS. 4 and 5 or any of the other techniques described herein. By applying these techniques to each row along the first dimension, artificial discontinuities within each row along this first dimension may be eliminated. Discontinuities may remain, however, between rows (i.e., along the second dimension). This is also described below with respect to FIG. 10.

In some embodiments, modulation and demodulation (including using balanced patterns) may be used to determine offsets and eliminate artificial discontinuities along the second dimension (e.g., pixel groups 606a, 606b). Offsets along the second dimension may be determined according to any of the technical approaches described herein.

In some embodiments, the lines along the two dimensions may be transposed when performing modulation, demodulation, and/or offset determination along the second dimension. For example, the drive lines and pickup lines may be temporarily swapped at this time (e.g., per instruction by a processor), with the result that the modulation and demodulation approach may acquire signal data for pixel groups along the second dimension. In some embodiments, at a first time, during which signals are modulated and demodulated along the first dimension, a first set of lines disposed along the first dimension may be one of (i) drive lines and (ii) pickup lines. At a second time, after the transposing step, during which signals are modulated and demodulated along the second dimension, the first set of lines disposed along the first dimension may be swapped such that the lines are the other of (i) drive lines and (ii) pickup lines. For example, if the lines were drive lines at the first time, they could be transposed to pickup lines and vice versa. In some embodiments, the lines may be transposed back to their original states when performing the next scan cycle along the first dimension.

The exemplary embodiments illustrated in FIGS. 4-6 depict a single common pixel shared among a small number of pixel groups arranged in straight lines. These arrangements are merely for purposes of illustration and can be varied without departing from the scope of the present disclosure. For example, a pixel group may be arranged across multiple lines of a sensor. A given line of a sensor may use a single common pixel or many (i.e., more than the two or three groups illustrated in FIGS. 4-6), and the pixel groups may be uniformly sized or may vary. In some embodiments, one, more, or each line of a sensor may have a respective common pixel which each pixel group in that respective line may include. In some embodiments, the pixel groups may be uniformly sized across a given line and/or across the whole sensor. In some embodiments, the pixel groups may include three, four, five, six, seven, eight, nine, ten, eleven, twelve, or more pixels per respective group.

Figure 7:
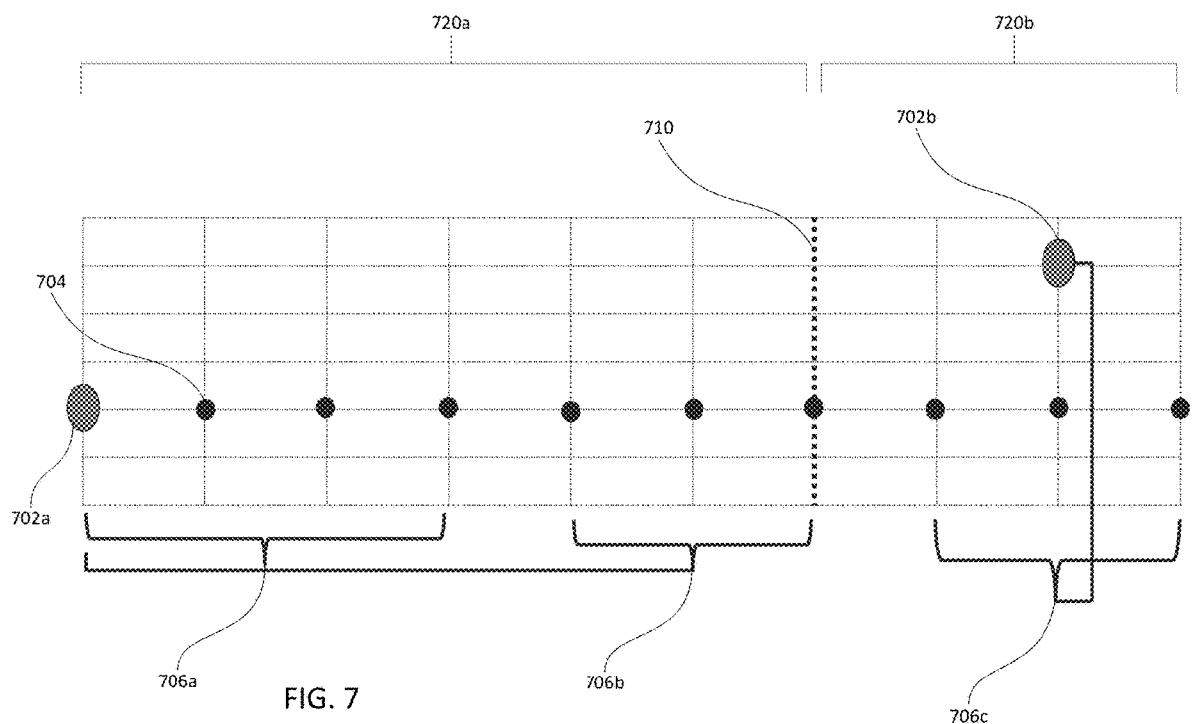
FIG. 7 illustrates an exemplary embodiment for determining pixel values using partitioned regions and/or reference pixels.

FIG. 7 depicts an exemplary embodiment in which a sensor surface is divided into two-dimensional regions. For example, a sensor may include two regions 720a, 720b separated by a partition 710. One or more partitions 710 may be provided via software, firmware, hardware, or any combination of the above. In other embodiments, pixels may be grouped into regions without expressly defining partitions. Although FIG. 7 illustrates contiguous regions 720, this illustration is intended for simplicity of explanation and should not be construed as limiting in any way. As discussed above, in some embodiments, pixels belonging to a given region may be interleaved with those of another region, and such interleaving may be performed along either dimension, or alternatively, along two dimensions simultaneously. Interleaving may advantageously reduce electrical interference between, for example, neighboring signal lines. This reduction in interference may also benefit other transducer systems, including those without signal lines.

A plurality of pixels 704 may be provided in each of the regions. For each pixel within a given region, relative pixel values may be determined via the methods described herein. In some embodiments, true values for these pixels may then be determined by comparison to a common pixel 702a, 702b within the respective region. The true values for the common pixels 702a, 702b may be determined by running an additional data capture step for these pixels in which the above-described processing steps are not used and the true value (including common mode offsets) are included. In other embodiments, the common pixels can themselves form a pixel group whereby the relative values for the common pixels may be determined. In this manner, relative values between the regions may be determined. As discussed above, this prevents or reduces artificial discontinuities, thereby providing an output that can be accurately analyzed and interpreted. These techniques for determining true values or relative values between common pixels can also be used in any of the other approaches described herein, such as those illustrated in FIGS. 4-6 and 8-11.

In some embodiments, a region may include multiple pixel groups 706a, 706b that share the common pixel 702a. In some embodiments, all of the pixels within a given region may form a single pixel group 706c that includes the common pixel 702b.

Figure 8:
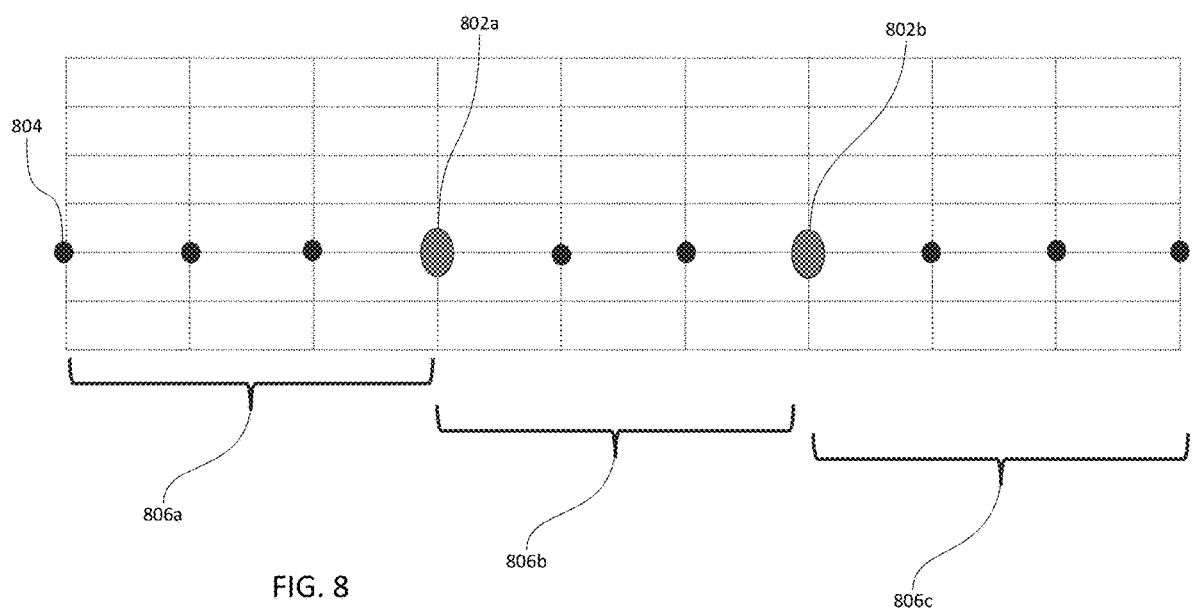
FIGS. 8-10 illustrate exemplary embodiments for determining pixel values by using common pixels and/or expected relationships between nearby pixels.

FIG. 8 illustrates yet another technical approach for determining offset values between pixel groups. In this exemplary embodiment, a plurality of pixels 804 are organized into three or more pixel groups 806a, 806b, 806c. A first pixel group 806a may share a common pixel 802a with a second pixel group 806b. The second pixel group 806b may share a common pixel 802b with a third pixel group 806c. In this manner, and first offset value between group 806a and 806b may be determined via common pixel 802a, and a second offset value between group 806b and 806c may be determined via common pixel 802b, and so on. This arrangement may be continued indefinitely, including up to the boundaries of the sensor. The chain of known relations between adjacent pixel groups allows values for all of the linked pixels to be determined.

In the embodiment of FIG. 8, it is possible to determine pixel values for a given line (or multiple lines or regions where the linked pixels are disposed across multiple lines) by chaining a series of determined offsets together. In some cases, however, this arrangement could result in small inaccuracies in initial measurements being compounded as these measurement values are used to determine offset values for subsequent groups. For example, if the measured relationship between group one and group two is then used to determine offset values for groups three, four, and so on, it can be very important to ensure accuracy with each measurement. In some embodiments, this objective may be achieved by collecting measurements from multiple pixels in a line in which a common pixel 802a is disposed, and determining one or more correlation values between pixels or pixel groups near that common pixel 802a. Since it is expected that measurements for adjacent pixels or adjacent lines are typically similar, the correlation may be high. In some embodiments, an offset value is determined for which the correlation is maximized. In this manner, repetitive measurements of given pixel values may be used in determining an offset value, thereby reducing the likelihood that a single erroneous measurement will compromise a chain of resultant pixel value calculations.

Figure 9:
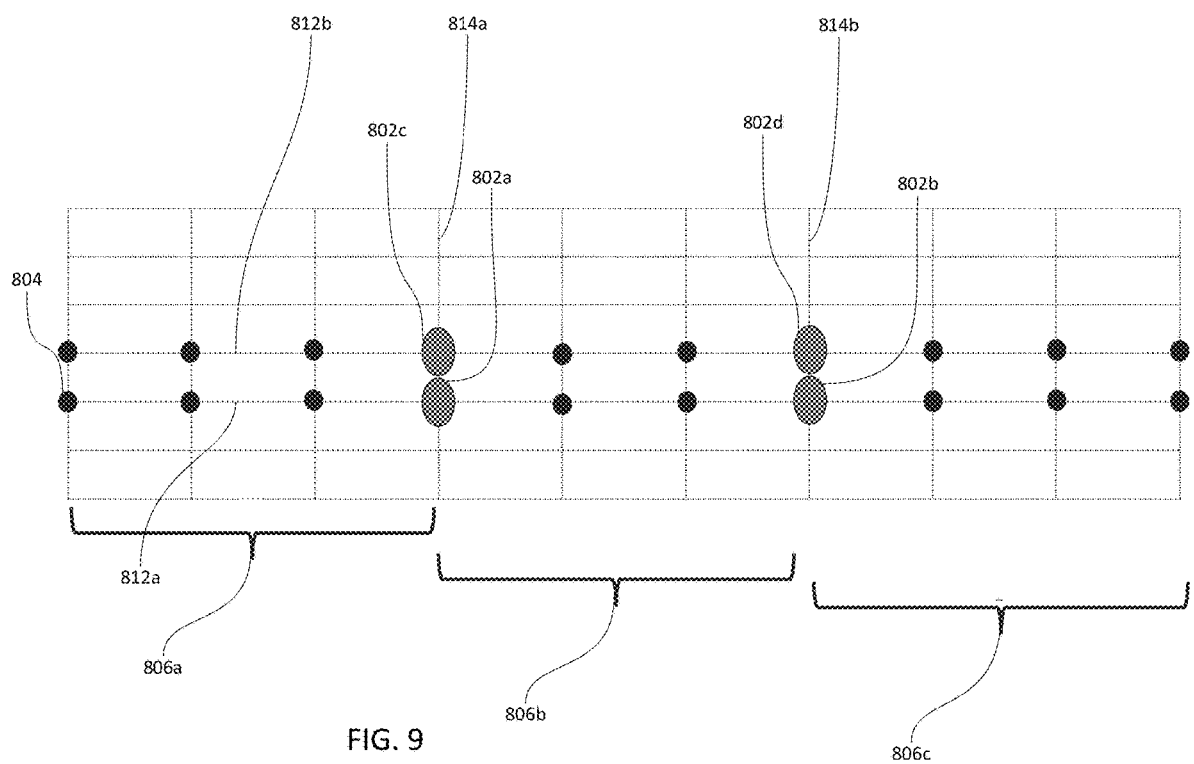

For example, in the exemplary embodiment illustrated in FIG. 9, two rows of pixel groups 806a, 806b, 806c are arranged on sensor lines 812a, 812b (these lines may be, e.g., drive lines or pickup lines). In some embodiments, the lines 812a, 812b may be adjacent to one another. In other embodiments, the lines may be proximate to one another. On the first line 812a, pixel groups 806a and 806b may share a common pixel 802a, and pixel groups 806b and 806c may share a common pixel 802b. On the second line 812b, pixel groups 806a and 806b may share a common pixel 802c, and pixel groups 806b and 806c may share a common pixel 802d. Common pixels 802a and 802b may be arranged on a line 814a extending transversely to the lines 812a, 812b. Common pixels 802c and 802d may be arranged on a line 814b extending transversely to the lines 812a, 812b. This arrangement of pixel groups and common pixels may be continued indefinitely in the transverse dimension. In this manner, any number of common pixels may share a given line.

In some embodiments, it may be expected that true values for nearby pixels will be highly correlated. For example, the true value for pixel 802*a* may be expected to be similar to (or equal to) the true value for pixel 802*c*. Likewise, the true value for pixel 802*b* may be expected to be similar to (or equal to) the true value for pixel 802*d*. This expected correlation need not be limited to the common pixels, and the same assumption may be applied to any number or all of the pixels in adjacent (or proximate) rows. By assuming a high degree of correlation between adjacent (or proximate) pixels, it may be possible in some embodiments to further improve offset value determinations. For example, when determining an offset value between first and second pixel groups in the first line 812*a*, determined values for one or more pixels in row 812*b* may be considered. For example, an offset value may be selected such that the correlation between adjacent (or proximate) pixel values is maximized. In some embodiments, this process of maximizing correlation may be carried across multiple pixel groups, including up to across entire lines, regions, or the entirety of the sensor.

Figure 10:
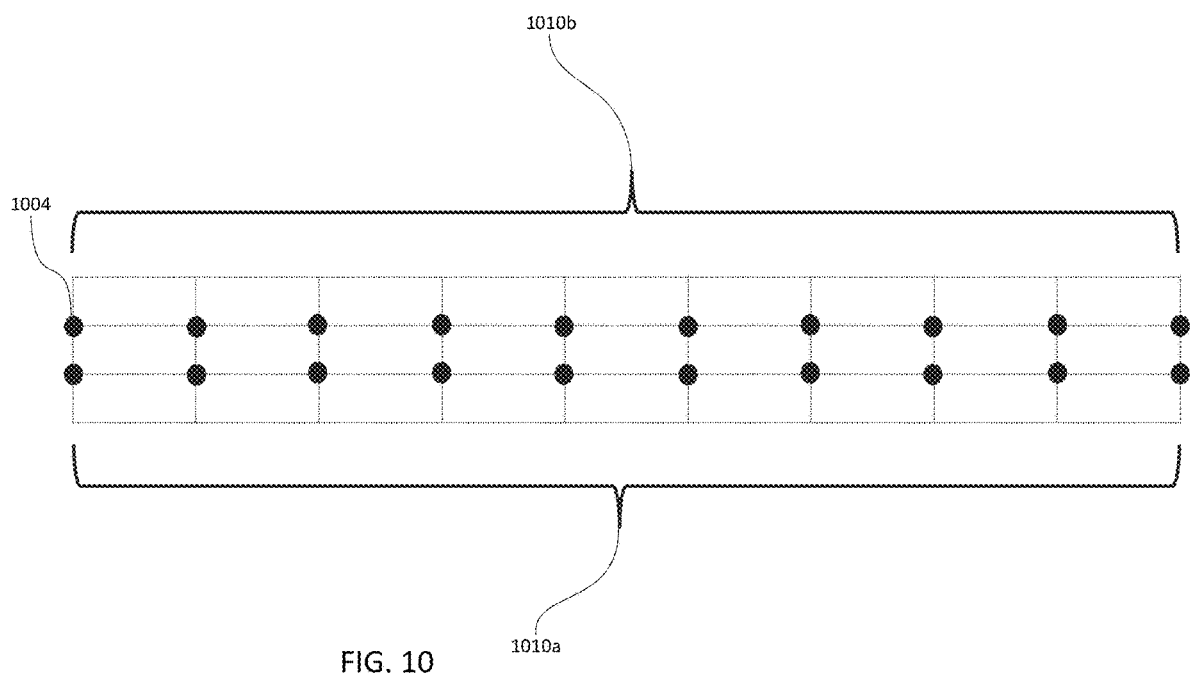

FIG. 10 depicts an exemplary embodiment in which correlation between adjacent lines may be used to determine offsets between adjacent pixel groups or lines. In the illustrated example, a series of pixels 1004 may be organized into adjacent (or proximate) pixel rows 1010*a* and 1010*b*. Each row 1010*a*, 1010*b* may represent an entire line of the sensor, or alternatively, the rows 1010*a*, 1010*b* may represent a portion thereof. The pixels 1004 may be further organized into groups as discussed in previous embodiments. In embodiments where pixel values are processed such that average values are removed, offsets between pixels 1004 in a given row as well as between the rows 1010*a*, 1010*b* may be initially unknown. In some embodiments, offsets between pixels 1004 may be determined according to any of the technical approaches discussed herein, including via the strategies discussed with respect to FIGS. 4-9 and 11. After pixel values are adjusted to eliminate artificial discontinuities within given rows 1010*a*, 1010*b*, a first set of adjusted relative values for the row 1010*a* and a second set of adjusted relative values for the row 1010*b* may be obtained. A discontinuity may remain, however, between the rows 1010*a*, 1010*b*.

In some embodiments, a row offset value may be determined such that the artificial discontinuity between rows may be suppressed. In some embodiments, the row offset value between a first row 1010*a* and a second row 1010*b* may be determined by calculating a row offset value that substantially maximizes a correlation between the set of relative values for the first row 1010*a* and the set of relative values for the second row 1010*b*. After determining the row offset value between rows 1010*a* and 1010*b*, the pixel values for one or both of the rows may be adjusted in order to compensate for the determined difference. This process may be repeated for each row of the sensor. In this manner, offsets between rows may be efficiently determined and compensation may be applied to suppress artificial discontinuities.

Note that in some embodiments, a single technical approach may be used to determine offsets in two dimensions. For example, FIG. 6 illustrates a common pixel approach being used to determine offsets in two dimensions. However, it is also possible to employ different technical approaches along different dimensions or along different lines or regions of a sensor, including within a single dimension. In some embodiments, for example, the common pixel approach (see, e.g., FIGS. 4 and 5) could be utilized along a first dimension, and a correlation maximization approach (see, e.g., FIG. 10) could be used along a second dimension. The technical approaches disclosed herein are thus combinable with each other, including along different dimensions and within a single dimension along different lines or regions.

Figure 11:
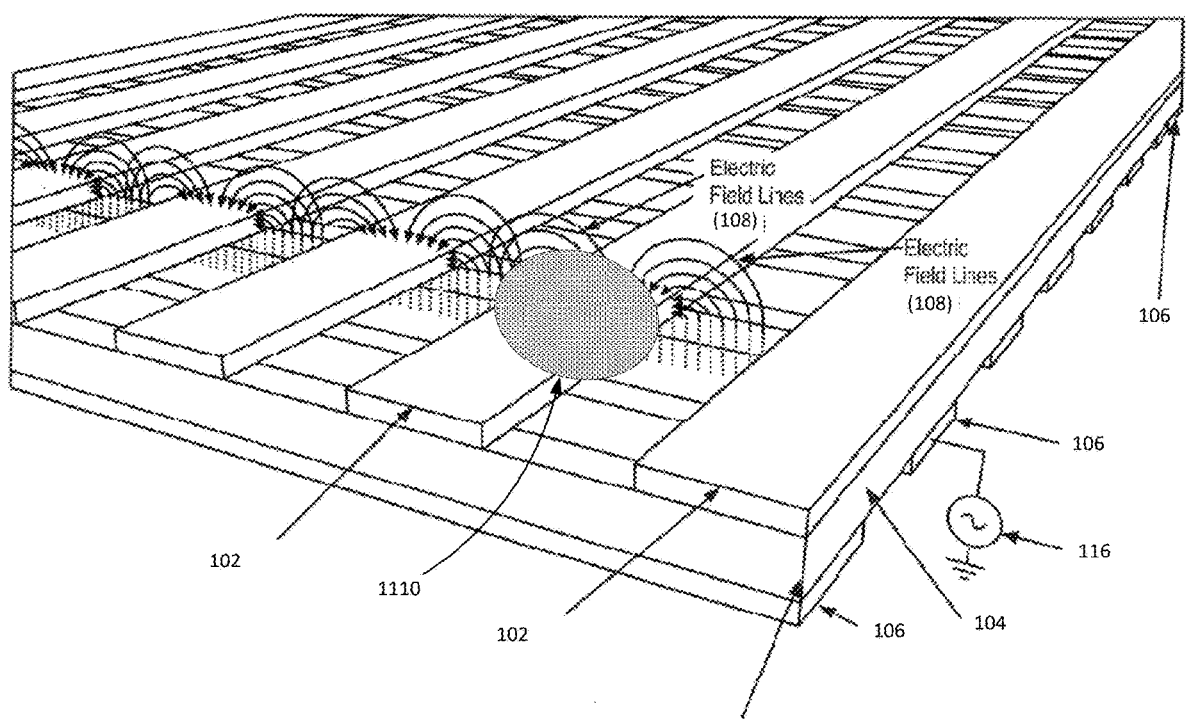
FIG. 11 illustrates an exemplary embodiment for determining pixel values using one or more shields.

FIG. 11 illustrates an exemplary embodiment in which one or more pixels may be known reference pixels. In some embodiments, one or more pixels may be isolated (which term broadly encompasses complete isolation or partial isolation, such as insulation) from stimulus applied by nearby drive lines. In some embodiments, this isolation may be provided by, for example, a dielectric shield 1110. For example, a shield 1110 may be arranged such that one or more selected pixels on a pickup line 102 are shielded from signals applied by nearby drive lines 106. In some embodiments, the shield 1110 may be arranged such that the selected pixels are shielded from signals applied by nearby drive lines 106 but are not shielded from noise applied by, e.g., a user's finger. In some embodiments, the isolation may be achieved via a split plate embodiment as described in U.S. application Ser. No. 15/722,488, which is incorporated by reference in its entirety. In some embodiments, the isolation may be achieved by having one or more drive lines 106 terminate so that the drive lines are not proximate to and do not apply electrical signals to one or more pickup lines 102. In some embodiments, the pickup lines 102 to which drive line signals are not applied may be coupled to a user's finger (or other object to be detected by the sensor). In such embodiments, the pickup lines 102 may receive no signal from the drive lines and would thus have a known value of substantially zero, but would still receive interference from the coupled finger, allowing this interference to be cancelled as discussed above.

By insulating one or more pixels from stimulus applied by drive lines, "known" reference pixels may be established. For example, isolated pixels may be presumed to have a true value of zero. By using these known true values in combination with relative values calculated as discussed above, true values for non-isolated values may be determined. For example, offset values may be selected for neighboring pixel groups such that the calculated value for the known reference pixel is equal to an expected value for the known reference pixel. This approach may be used in combination with the approaches discussed above. For example, one or more common pixels may be selected as known reference pixels. In another example, a sensor may be partitioned into regions where each region has a known reference pixel from which neighboring pixel values may be determined.

In any of the above approaches, one or more lines of the sensor may be provided beyond the region of the sensor that may be contacted by a user. This may have the effect of shielding the pixels on these lines from measurement signals and/or from noise. In this manner, pixels having known values may be established. In some embodiments, these known values may be zero or substantially zero. In some embodiments, these known values may be substantially equal to a signal (such as a carrier signal) applied by one or more drive lines. In some embodiments, lines may be provided at one or more edges of the sensor such that the lines are beyond the region of the sensor that may be contacted by a user. In other embodiments, pickup lines may be provided at one or more edges of the sensor such that the pickup lines are beyond the region to which signals are applied by the drive lines, thereby causing these pickup lines to receive finger-coupled noise but no measurement signal. The pixels on such lines may be used as known reference pixels and/or common pixels as described above. Such lines may also be usefully deployed in the correlation maximization embodiments described above, since this arrangement provides an entire line for which highly accurate true values may be readily obtained.

Figure 12:
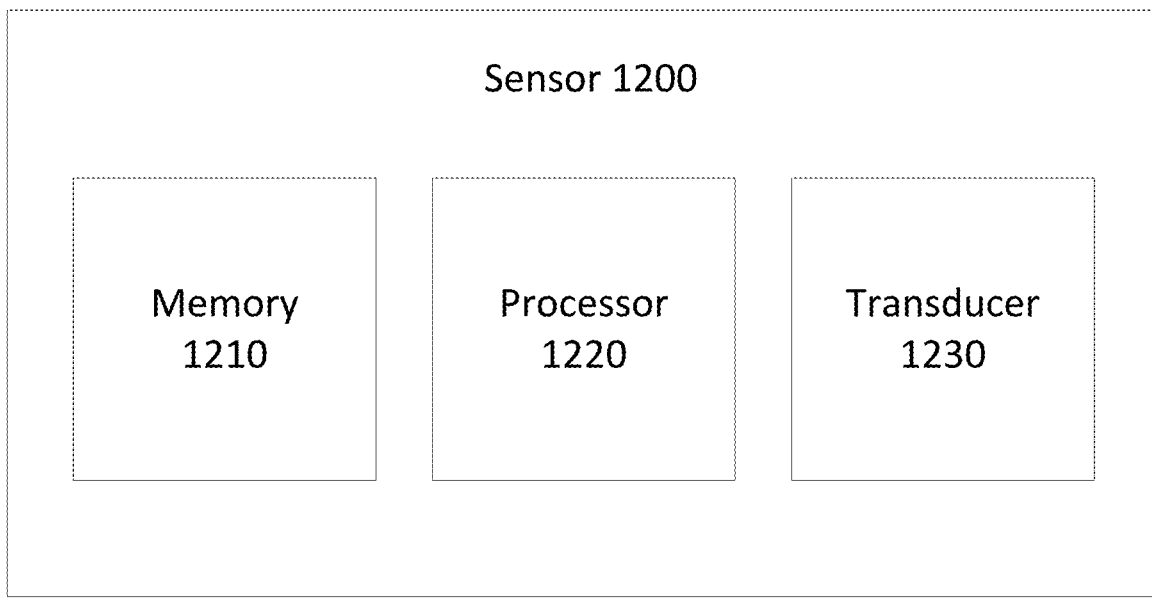
FIG. 12 depicts a schematic view of an exemplary sensor.

FIG. 12 illustrates a schematic diagram of an exemplary sensor 1200. The sensor 1200 may include a memory 1210, a processor 1220, and a transducer 1230. In some embodiments, the transducer 1230 may be embodied as a two-dimensional grid of pickup lines and drive lines as described above. The memory 1210 may store instructions for any of the processing steps, calculations, and/or determinations described herein. The processor 1220 may be configured to perform any of these processing steps, calculations, and/or determinations.

Figure 13:
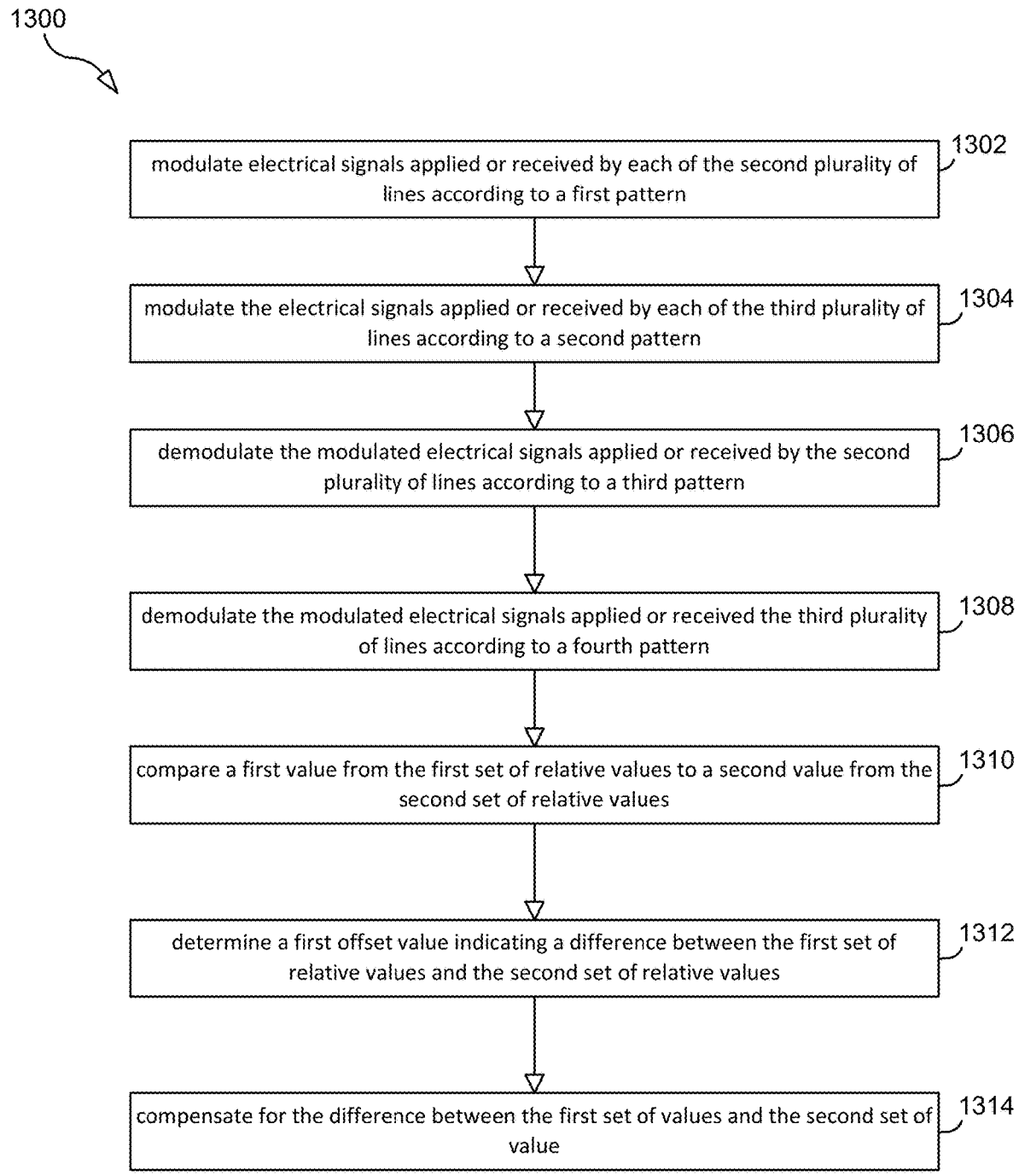
FIGS. 13-15 illustrate exemplary methods for determining pixel values.

Exemplary methods are described with reference to FIGS. 13 and 14. FIG. 13 illustrates an exemplary method 1300 which may be used in a system including a first plurality of lines, a second plurality of lines, and a third plurality of lines. In some embodiments, the first plurality of lines may intersect the second and third pluralities of lines, respectively defining first and second pixel groups. In some embodiments, the first plurality of lines may be a plurality of drive lines, and the second and third pluralities of lines may be pluralities of pickup lines. In other embodiments, the first plurality of lines may be a plurality of pickup lines, and the second and third pluralities of lines may be pluralities of drive lines. In some embodiments, the first, second, and third pluralities of lines may each include a first line and a second line. In some embodiments, the arrangement of pickup lines and drive lines may be arranged generally as shown in FIGS. 1-3. In some embodiments, a pickup line group 202 may define a plurality of pickup lines. In some embodiments, a drive line group 206 may define a plurality of drive lines.

As illustrated in FIG. 13, an exemplary method 1300 may be performed. In some embodiments, the method 1300 may be performed by or more processors. In exemplary step 1302, the processor may modulate electrical signals applied or received by each of the second plurality of lines according to a first pattern. In some embodiments, the first pattern may comprise n timeslots, and for each of the n timeslots, an array of modulation factors corresponding to the respective timeslot may sum to substantially zero. In exemplary step 1304, the processor may modulate the electrical signals applied or received by each of the third plurality of lines according to a second pattern. In some embodiments, the second pattern may comprise m timeslots, and for each of the m timeslots, an array of modulation factors corresponding to the respective timeslot may sum to substantially zero.

In exemplary step 1306, the processor may demodulate the modulated electrical signals applied or received by the second plurality of lines according to a third pattern. In some embodiments, the processor may thereby determine a first set of relative values for the first pixel group. In exemplary step 1308, the processor may demodulate the modulated electrical signals applied or received by the third plurality of lines according to a fourth pattern. In some embodiments, the processor may thereby determine a second set of relative values for the second pixel group.

In exemplary step 1310, the processor may compare a first value from the first set of relative values to a second value from the second set of relative values. This may include comparing only a single value from each set, or alternatively, multiple values or a calculation from the values may be compared. In step 1312, a first offset value indicating a difference between the first set of relative values and the second set of relative values may be determined. In some embodiments, this determination may be based upon the result of the comparison step 1310. In some embodiments, the comparison and offset determination may be performed according to one or more of the technical approaches described above with respect to FIGS. 4-11. In step 1314, the processor may compensate for the difference between the first set of values and the second set of values. In some embodiments, the processor may compensate for the difference between the first set of values and the second set of values may be based on the determined first offset value. For example, the determined first offset may be added to or subtracted from the values in the first and second sets of values, which may be relative values. By adding or subtracting the determined offset value, artificial discontinuities between these sets of values may be suppressed or eliminated.

In some embodiments, the comparison step 1310 may be performed under conditions whereby a difference between the first value and the second value is expected to be approximately zero in the absence of a nonzero first offset value. Exemplary approaches that satisfy this condition are described above, particularly with reference to FIGS. 4-11. For example, approaches using common pixels, known reference pixels, and correlation maximization may operate on the principle that a difference between measurement values would be approximately zero in the absence of a nonzero offset.

Figure 14:
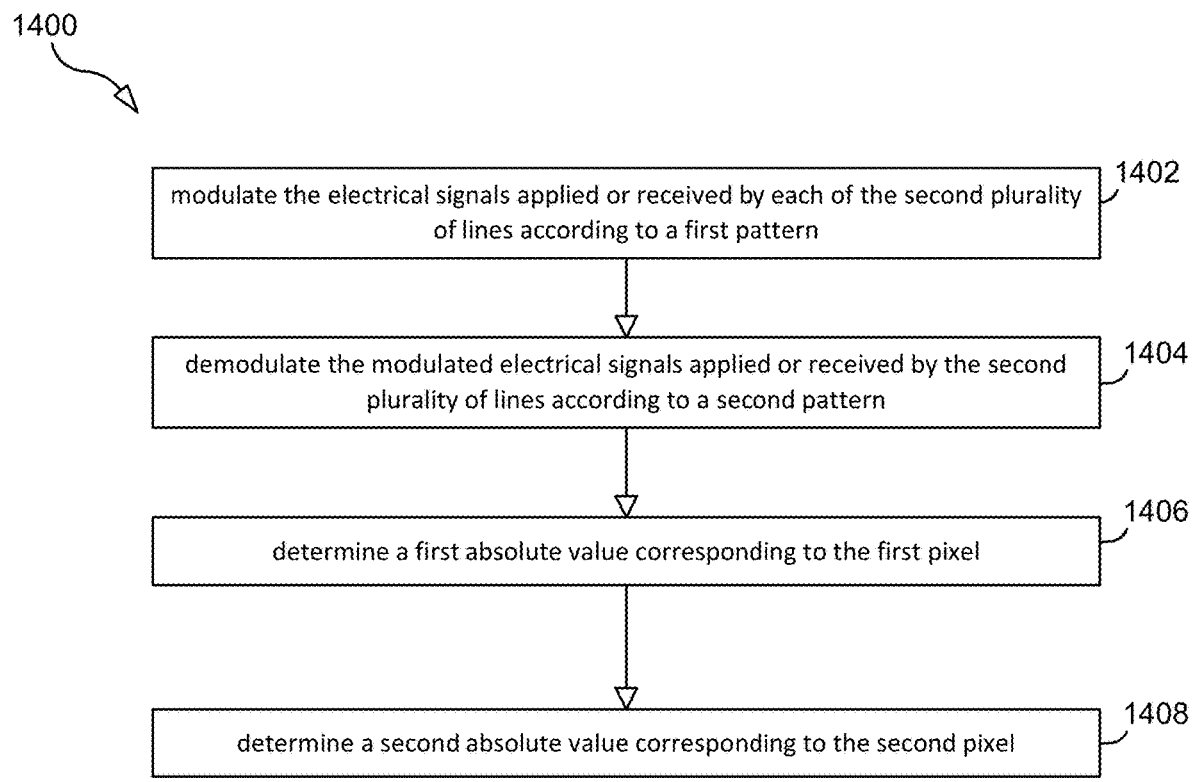

FIG. 14 illustrates an exemplary method 1400 which may be used in a system including a first plurality of lines and a second plurality of lines. In some embodiments, the second plurality of lines may be arranged to intersect with the first plurality of lines, and a set of the intersections between the first plurality of lines and the second plurality of lines may define a first pixel group comprising a plurality of pixels. In some embodiments, the first plurality of lines may be a plurality of drive lines, and the second plurality of lines may be a plurality of pickup lines. In other embodiments, the first plurality of lines may be a plurality of pickup lines, and the second plurality of lines may be a plurality of drive lines. In some embodiments, the first and second pluralities of lines may each include a first line and a second line. In some embodiments, the arrangement of pickup lines and drive lines may be arranged generally as shown in FIGS. 1-3. In some embodiments, a pickup line group 202 may define a plurality of pickup lines. In some embodiments, a drive line group 206 may define a plurality of drive lines.

As illustrated in FIG. 14, an exemplary method 1400 may be performed. In some embodiments, the method 1400 may be performed one or more processors. In step 1402, the processor may modulate the electrical signals applied or received by each of the second plurality of lines according to a first pattern. In some embodiments, the first pattern may include n timeslots, and for each of the n timeslots, an array of modulation factors corresponding to the respective timeslot may sum to substantially zero. In step 1404, the processor may demodulate the modulated electrical signals applied or received by the second plurality of lines according to a second pattern. In some embodiments, the processor may thereby determine a first set of relative values including a first relative value and a second relative value. In some embodiments, the first relative value may correspond to a first pixel and the second relative value may correspond to a second pixel. The first and second pixels may belong, for example, to the first pixel group.

In step 1406, the processor may determine a first absolute value corresponding to the first pixel. For example, the first absolute value may be determined by scanning a pixel or line without using a processing method that removes common mode signals. In other embodiments, known reference pixels or other approaches may be used to determine true values.

In step 1408, the processor may determine a second absolute value corresponding to the second pixel. In some embodiments, the determination of the second absolute value may be based on the determined first absolute value, the first relative value, and/or the second relative value. For example, where relative values for first and second pixels are known, and where a true value for the first pixel is also known, a true value for the second pixel may be determined by adding or subtracting a difference between the relative values for the first and second pixels from the true value for the second pixel.

Figure 15:
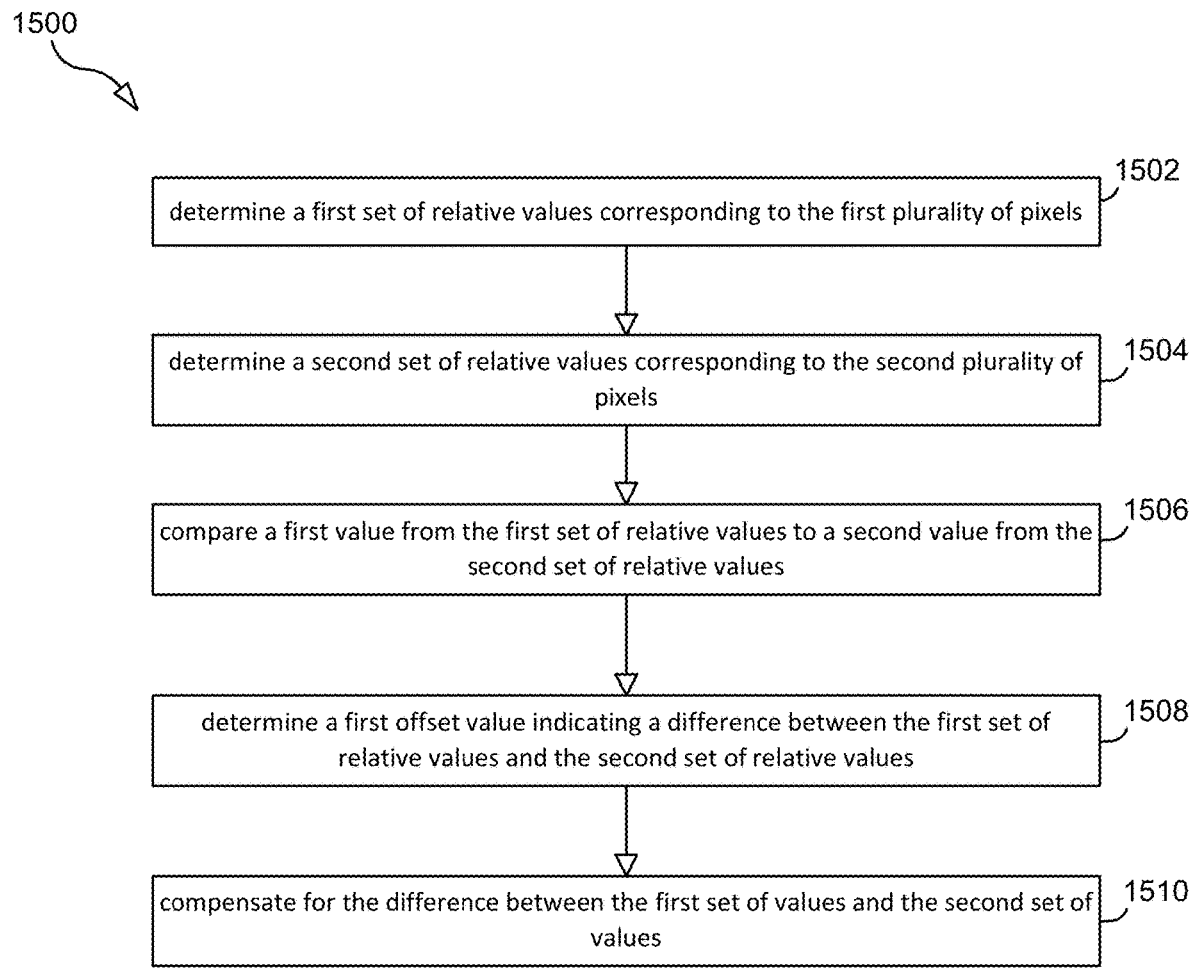

FIG. 15 illustrates an exemplary method 1500 which may be used in a system including system including a first plurality pixels, a second plurality of pixels, and one or more processors. In some embodiments, the pixels may be defined by drive lines and pickup lines as per the arrangements described above, including with respect to FIGS. 1-3. Other arrangements for defining pixels may also be used.

As illustrated in FIG. 15, an exemplary method 1500 may be performed. In some embodiments, the method 1500 may be performed by one or more processors. In step 1502, the processor may determine a first set of relative values corresponding to the first plurality of pixels. In step 1504, the processor may determine a second set of relative values corresponding to the second plurality of pixels. The relative value determinations may be performed according to any of the processing techniques described above, including with respect to FIGS. 1-3. Other techniques for determining relative values may also be used, and the manner in which the relative values are determined should not be construed as limiting. In step 1506, the processor may compare a first value from the first set of relative values to a second value from the second set of relative values. This may include comparing only a single value from each set, or alternatively, multiple values or a calculation from the values may be compared. In step 1508, a first offset value indicating a difference between the first set of relative values and the second set of relative values may be determined. In some embodiments, this determination may be based upon the result of the comparison step 1506. In some embodiments, the comparison and offset determination may be performed according to one or more of the technical approaches described above with respect to FIGS. 4-11. In step 1510, the processor may compensate for the difference between the first set of values and the second set of values. In some embodiments, the processor may compensate for the difference between the first set of values and the second set of values may be based on the determined first offset value. For example, the determined first offset may be added to or subtracted from the values in the first and second sets of values, which may be relative values. By adding or subtracting the determined offset value, artificial discontinuities between these sets of values may be suppressed or eliminated.

In some embodiments, the comparison step 1506 may be performed under conditions whereby a difference between the first value and the second value is expected to be approximately zero in the absence of a nonzero first offset value. Exemplary approaches that satisfy this condition are described above, particularly with reference to FIGS. 4-11. For example, approaches using common pixels, known reference pixels, and correlation maximization may operate on the principle that a difference between measurement values would be approximately zero in the absence of a nonzero offset.

EXEMPLARY EMBODIMENTS

Embodiment 1

A system for detecting a user's finger or other element, the system comprising:

a first plurality of lines, the first plurality of lines comprising a first line and a second line, each line in the first plurality of lines being configured to apply or receive an electrical signal;

a second plurality of lines arranged to intersect with the first plurality of lines, the second plurality of lines comprising a first line and a second line, each line in the second plurality of lines being configured to apply or receive an electrical signal, a set of the intersections between the first plurality of lines and the second plurality of lines defining a first pixel group comprising a plurality of pixels;

a third plurality of lines arranged to intersect with the first plurality of lines, the third plurality of lines comprising a first line and a second line, each line in the third plurality of lines being configured to apply or receive an electrical signal, a set of the intersections between the third plurality of lines and the first plurality of lines defining a second pixel group comprising a plurality of pixels;

a processor configured to:
  modulate the electrical signals applied or received by each of the second plurality of lines according to a first pattern;
  modulate the electrical signals applied or received by each of the lines of the third plurality of lines according to a second pattern;
  demodulate the modulated electrical signals applied or received by the second plurality of lines according to a third pattern, thereby determining a first set of relative values for the first pixel group;
  demodulate the modulated electrical signals applied or received by the third plurality of pickup lines according to a fourth pattern, thereby determining a second set of relative values for the second pixel group;
  compare a first value from the first set of relative values to a second value from the second set of relative values;
  based on the comparing step, determine a first offset value indicating a difference between the first set of relative values and the second set of relative values;
  based on the determined first offset value, compensate for the difference between the first set of relative values and the second set of relative values.

Embodiment 2

The system of embodiment 1, wherein the comparing step is performed under conditions whereby a difference between the first value and the second value is expected to be approximately zero in the absence of a nonzero first offset value.

Embodiment 3

The system of any of embodiments 1 and 2, wherein the first pattern comprises n timeslots, wherein for each of the n timeslots, an array of modulation factors corresponding to the respective timeslot sums to substantially zero.

Embodiment 4

The system of any of embodiments 1-3, wherein the first pixel group and the second pixel group share a common pixel.

Embodiment 5

The system of embodiment 4, wherein the first value corresponds to the common pixel, and the second value corresponds to the common pixel.

Embodiment 6

The system of any of embodiments 1-5, further comprising:
a fourth plurality of lines arranged to intersect with the second plurality of lines, the fourth plurality of lines comprising a first line and a second line, each line in the second plurality of lines being configured to apply or receive an electrical signal, a set of the intersections between the fourth plurality of lines and the second plurality of lines defining a third pixel group comprising a plurality of pixels;
wherein the processor is further configured to:
determine a third set of relative values for the third pixel group;
determine a second offset value indicating a difference between the first set of relative values and the third set of relative values;
based on the determined first offset value, compensate for the difference between the first set of relative values and the third set of relative values.

Embodiment 7

The system of embodiment 6, wherein the first plurality of lines and the fourth plurality of lines share a common line.

Embodiment 8

The system of any of embodiments 6 and 7, wherein the processor is further configured to perform a transposing step wherein:
at a first time, during which the electrical signals applied or received by each of the second plurality of lines are modulated according to the first pattern, each of the second plurality of lines are one of (i) drive lines and (ii) pickup lines; and
at a second time, during which electrical signals applied or received by each of the fourth plurality of lines are modulated, each of the second plurality of lines are the other of (i) drive lines and (ii) pickup lines.

Embodiment 9

The system of any of embodiments 1-8, further comprising a first row of pixels and a second row of pixels, wherein the processor is further configured to:
determine a set of relative values for the first pixel row;
determine a set of relative values for the second pixel row;
determine a row offset value which substantially maximizes a correlation between the set of relative values for the first pixel row and the set of relative values for the second pixel row; and
based on the determined row offset value, compensate for a difference between the set of relative values for the first pixel row and the set of relative values for the second pixel row.

Embodiment 10

The system of embodiment 9, wherein the first pixel row comprises the first pixel group and the second pixel group.

Embodiment 11

The system of any of embodiments 1-10, wherein the first set of relative values comprises a first relative value corresponding to a first pixel and a second relative value corresponding to a second pixel, wherein the processor is further configured to:
determine a first absolute value corresponding to the first pixel; and
based on the determined first absolute value, the first relative value, and/or the second relative value, determine a second absolute value corresponding to the second pixel.

Embodiment 12

The system of embodiment 11, wherein determining the first absolute value comprises:
modulating electrical signals applied or received by each of a fifth plurality of lines according to a fifth pattern, the fifth plurality of lines comprising a first line and a second line, wherein the first line of the second plurality of lines is the same line as the first line of the fifth plurality of lines;
demodulating the modulated electrical signals applied or received by the fifth plurality of lines according to a sixth pattern, thereby determining a set of absolute values, the set of absolute values comprising the first absolute value.

Embodiment 13

The system of embodiment 11, wherein an electrical isolator is disposed at a position proximate a first pixel of the first pixel group, the isolator being arranged to isolate a pickup line from a signal applied by a drive line.

Embodiment 14

The system of any of embodiments 6-13, further comprising a sixth plurality of lines arranged to intersect with the first plurality of lines, the sixth plurality of lines comprising a first line and a second line, each line in the sixth plurality of lines being configured to apply or receive an electrical signal, a set of the intersections between the second plurality of lines and the sixth plurality of lines defining a fourth pixel group comprising a plurality of pixels;
wherein the processor is further configured to:
modulate the electrical signals applied or received by the sixth plurality of lines according to the first pattern;
demodulate the modulated electrical signals from the sixth plurality of lines according to the third pattern, thereby determining a fourth set of relative values for the fourth pixel group;
determine a third offset value indicating a difference between the fourth set of relative values and at least one of the first set of relative values and the third set of relative values, the third offset value being determined by comparing a value from the fourth set of relative values to a value from the first and/or third set of relative values;
based on the determined third offset value, compensate for the difference between the fourth set of relative values and at least one of the first and/or third set of relative values.

Embodiment 15

The system of any of embodiments 1-14, further comprising a seventh plurality of lines arranged to intersect with the first plurality of lines, the seventh plurality of lines comprising a first line and a second line, each line in the seventh plurality of lines being configured to apply or receive an electrical signal, a set of the intersections between the first plurality of lines and the seventh plurality of lines defining a fifth pixel group comprising a plurality of pixels;

wherein the processor is further configured to:

modulate the electrical signals applied or received by the seventh plurality of lines according to a seventh pattern;

demodulate the modulated electrical signals from the seventh plurality of lines according to an eighth pattern, thereby determining a fifth set of relative values for the fifth pixel group;

determine a fourth offset value indicating a difference between the fifth set of relative values and at least one of the first set of relative values and the second set of relative values, the fourth offset value being determined by comparing a value from the fifth set of relative values to a value from the first and/or second set of relative values;

based on the determined fourth offset value, compensate for the difference between the fifth set of relative values and at least one of the first and/or second set of relative values.

Embodiment 16

The system of embodiment 15, wherein the second plurality of lines, the third plurality of lines, and the seventh plurality of lines share a common line, the first line of the second plurality of lines, the first line of the third plurality of lines, and the first line of the seventh plurality of lines being the common line.

Embodiment 17

The system of embodiment 15, wherein the second plurality of lines and the third plurality of lines share a first common line, the first line of the second plurality of lines and the first line of the third plurality of lines being the first common line;

the third plurality of lines and the seventh plurality of lines share a second common line, the second line of the third plurality of lines and the first line of the seventh plurality of lines being the second common line.

Embodiment 18

The system of embodiment 17, wherein the processor is further configured to:

determine the first offset value by comparing the first value from the first set of relative values, the first value corresponding to a pixel along the first common line, to a second value from the second set of relative values, the second value corresponding to the pixel along the first common line; and determine the fourth offset value by comparing a third value from the second set of relative values, the third value corresponding to a pixel along the second common line, to a fourth value from the fifth set of relative values, the fourth value corresponding to the pixel along the second common line.

Embodiment 19

A system for detecting a user's finger or other element, the system comprising:

a first plurality of lines, the first plurality of lines comprising a first line and a second line, each drive line in the first plurality of lines being configured to apply or receive an electrical signal;

a second plurality of lines arranged to intersect with the first plurality of lines, the second plurality of lines comprising a first line and a second line, each line in the second plurality of lines being configured to apply or receive an electrical signal, a set of the intersections between the first plurality of lines and the second plurality of lines defining a first pixel group comprising a plurality of pixels;

a processor configured to:

modulate the electrical signals applied or received by each of the second plurality of lines according to a first pattern;

demodulate the modulated electrical signals applied or received by the second plurality of lines according to a second pattern, thereby determining a first set of relative values for the first pixel group, the first set of relative values comprising a first relative value corresponding to a first pixel and a second relative value corresponding to a second pixel, determine a first absolute value corresponding to the first pixel; and based on the determined first absolute value, the first relative value, and/or the second relative value, determine a second absolute value corresponding to the second pixel.

Embodiment 20

The system of embodiment 19, wherein determining the first absolute value comprises:

modulating electrical signals applied or received by each line of a third plurality of lines according to a third pattern, the third plurality of lines comprising a first line and a second line, wherein the first line of the second plurality of lines is the same line as the first line of the third plurality of lines, a set of the intersections between the first plurality of lines and the third plurality of lines defining a second pixel group comprising a plurality of pixels;

demodulating the modulated electrical signals applied or received by the second plurality of pickup lines according to a fourth pattern, thereby determining a set of absolute values, the set of absolute values comprising the first absolute value.

Embodiment 21

The system of embodiment 20, wherein the third pattern comprises m time slots, wherein for at least one of the m timeslots, an array of modulation factors corresponding to the at least one timeslot sums to value that is not substantially zero.

Embodiment 22

The system of any of embodiments 19-21, wherein the first pattern comprises n timeslots, wherein for each of the n timeslots, an array of modulation factors corresponding to the respective timeslot sums to substantially zero.

Embodiment 23

The system of any of embodiments 18-22, wherein an electrical isolator is disposed at a position proximate the first pixel, the isolator being arranged to isolate a pickup line from a signal applied by a drive line.

Embodiment 24

A system for detecting a user's finger or other element, the system comprising:

a first plurality of pixels, the first plurality of pixels comprising a first pixel and a second pixel;

a second plurality of pixels, the second plurality of pixels comprising a first pixel and a second pixel;

a processor configured to:

determine a first set of relative values corresponding to the first plurality of pixels;

determine a second set of relative values corresponding to the second plurality of pixels;

compare a first value from the first set of relative values to a second value from the second set of relative values;

based on the comparing step, determine a first offset value indicating a difference between the first set of relative values and the second set of relative values;

based on the determined first offset value, compensate for the difference between the first set of relative values and the second set of relative values.

Embodiment 25

The system of embodiment 24, wherein the comparing step is performed under conditions whereby a difference between the first value and the second value is expected to be approximately zero in the absence of a nonzero first offset value.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A system for detecting a user's finger or other element, the system comprising:
    a first plurality of lines, the first plurality of lines comprising a first line and a second line, each line in the first plurality of lines being configured to apply or receive an electrical signal;
    a second plurality of lines arranged to intersect with the first plurality of lines, the second plurality of lines comprising a first line and a second line, each line in the second plurality of lines being configured to apply or receive an electrical signal, a set of the intersections between the first plurality of lines and the second plurality of lines defining a first pixel group comprising a plurality of pixels;
    a third plurality of lines arranged to intersect with the first plurality of lines, the third plurality of lines comprising a first line and a second line, each line in the third plurality of lines being configured to apply or receive an electrical signal, a set of the intersections between the third plurality of lines and the first plurality of lines defining a second pixel group comprising a plurality of pixels;
    a processor configured to:
        modulate the electrical signals applied or received by each of the second plurality of lines according to a first pattern;
        modulate the electrical signals applied or received by each of the lines of the third plurality of lines according to a second pattern;
        demodulate the modulated electrical signals applied or received by the second plurality of lines according to a third pattern, thereby determining a first set of relative values for the first pixel group;
        demodulate the modulated electrical signals applied or received by the third plurality of lines according to a fourth pattern, thereby determining a second set of relative values for the second pixel group;
        compare a first value from the first set of relative values to a second value from the second set of relative values;
        based on the comparing step, determine a first offset value indicating a difference between the first set of relative values and the second set of relative values;
        based on the determined first offset value, compensate for the difference between the first set of relative values and the second set of relative values.

2. The system of claim 1, wherein the comparing step is performed under conditions whereby a difference between the first value and the second value is expected to be approximately zero in the absence of a nonzero first offset value.

3. The system of claim 1, wherein the first pattern comprises n timeslots, wherein for each of the n timeslots, an array of modulation factors corresponding to the respective timeslot sums to substantially zero.

4. The system of claim 1, wherein the first pixel group and the second pixel group share a common pixel.

5. The system of claim 4, wherein the first value corresponds to the common pixel, and the second value corresponds to the common pixel.

6. The system of claim 1, further comprising:
    a fourth plurality of lines arranged to intersect with the second plurality of lines, the fourth plurality of lines comprising a first line and a second line, each line in the fourth plurality of lines being configured to apply or receive an electrical signal, a set of the intersections between the fourth plurality of lines and the second plurality of lines defining a third pixel group comprising a plurality of pixels;
    wherein the processor is further configured to:
        determine a third set of relative values for the third pixel group;
        determine a second offset value indicating a difference between the first set of relative values and the third set of relative values;
        based on the determined second offset value, compensate for the difference between the first set of relative values and the third set of relative values.

7. The system of claim 6, wherein the first pixel group, the second pixel group, and the third pixel group share a common pixel.

8. The system of claim 6, wherein the processor is further configured to perform a transposing step wherein:
    at a first time, during which the electrical signals applied or received by each of the second plurality of lines are modulated according to the first pattern, each of the second plurality of lines are one of (i) drive lines and (ii) pickup lines; and
    at a second time, during which electrical signals applied or received by each of the fourth plurality of lines are modulated, each of the second plurality of lines are the other of (i) drive lines and (ii) pickup lines.

9. The system of claim 1, further comprising a first row of pixels and a second row of pixels, wherein the processor is further configured to:
- determine a set of relative values for the first pixel row;
- determine a set of relative values for the second pixel row;
- determine a row offset value which substantially maximizes a correlation between the set of relative values for the first pixel row and the set of relative values for the second pixel row; and
- based on the determined row offset value, compensate for a difference between the set of relative values for the first pixel row and the set of relative values for the second pixel row.

10. The system of claim 9, wherein the first pixel row comprises the first pixel group and the second pixel group.

11. The system of claim 1, wherein the first set of relative values comprises a first relative value corresponding to a first pixel and a second relative value corresponding to a second pixel, wherein the processor is further configured to:
- determine a first absolute value corresponding to the first pixel; and
- based on the determined first absolute value, the first relative value, and/or the second relative value, determine a second absolute value corresponding to the second pixel.

12. The system of claim 11, wherein determining the first absolute value comprises:
- modulating electrical signals applied or received by each of a fifth plurality of lines according to a fifth pattern, the fifth plurality of lines comprising a first line and a second line, wherein the first line of the second plurality of lines is the same line as the first line of the fifth plurality of lines;
- demodulating the modulated electrical signals applied or received by the fifth plurality of lines according to a sixth pattern, thereby determining a set of absolute values, the set of absolute values comprising the first absolute value.

13. The system of claim 1, wherein an electrical isolator is disposed at a position proximate a first pixel of the first pixel group, the isolator being arranged to electrically isolate a line of the first plurality of lines from a line of the second plurality of lines.

14. The system of claim 6, further comprising a sixth plurality of lines arranged to intersect with the first plurality of lines, the sixth plurality of lines comprising a first line and a second line, each line in the sixth plurality of lines being configured to apply or receive an electrical signal, a set of the intersections between the second plurality of lines and the sixth plurality of lines defining a fourth pixel group comprising a plurality of pixels;
wherein the processor is further configured to:
- modulate the electrical signals applied or received by the sixth plurality of lines according to the first pattern;
- demodulate the modulated electrical signals from the sixth plurality of lines according to the third pattern, thereby determining a fourth set of relative values for the fourth pixel group;
- determine a third offset value indicating a difference between the fourth set of relative values and at least one of the first set of relative values and the third set of relative values, the third offset value being determined by comparing a value from the fourth set of relative values to a value from the first and/or third set of relative values;
- based on the determined third offset value, compensate for the difference between the fourth set of relative values and at least one of the first and/or third set of relative values.

15. The system of claim 1, further comprising a seventh plurality of lines arranged to intersect with the first plurality of lines, the seventh plurality of lines comprising a first line and a second line, each line in the seventh plurality of lines being configured to apply or receive an electrical signal, a set of the intersections between the first plurality of lines and the seventh plurality of lines defining a fifth pixel group comprising a plurality of pixels;
wherein the processor is further configured to:
- modulate the electrical signals applied or received by the seventh plurality of lines according to a seventh pattern;
- demodulate the modulated electrical signals from the seventh plurality of lines according to an eighth pattern, thereby determining a fifth set of relative values for the fifth pixel group;
- determine a fourth offset value indicating a difference between the fifth set of relative values and at least one of the first set of relative values and the second set of relative values, the fourth offset value being determined by comparing a value from the fifth set of relative values to a value from the first and/or second set of relative values;
- based on the determined fourth offset value, compensate for the difference between the fifth set of relative values and at least one of the first and/or second set of relative values.

16. The system of claim 15, wherein the second plurality of lines, the third plurality of lines, and the seventh plurality of lines share a common line, the first line of the second plurality of lines, the first line of the third plurality of lines, and the first line of the seventh plurality of lines being the common line.

17. The system of claim 15, wherein the second plurality of lines and the third plurality of lines share a first common line, the first line of the second plurality of lines and the first line of the third plurality of lines being the first common line;
the third plurality of lines and the seventh plurality of lines share a second common line, the second line of the third plurality of lines and the first line of the seventh plurality of lines being the second common line.

18. The system of claim 17, wherein the processor is further configured to:
- determine the first offset value by comparing the first value from the first set of relative values, the first value corresponding to a pixel along the first common line, to a second value from the second set of relative values, the second value corresponding to the pixel along the first common line; and
- determine the fourth offset value by comparing a third value from the second set of relative values, the third value corresponding to a pixel along the second common line, to a fourth value from the fifth set of relative values, the fourth value corresponding to the pixel along the second common line.

19. A system for detecting a user's finger or other element, the system comprising:
- a first plurality of lines, the first plurality of lines comprising a first line and a second line, each line in the first plurality of lines being configured to apply or receive an electrical signal;

a second plurality of lines arranged to intersect with the first plurality of lines, the second plurality of lines comprising a first line and a second line, each line in the second plurality of lines being configured to apply or receive an electrical signal, a set of the intersections between the first plurality of lines and the second plurality of lines defining a first pixel group comprising a plurality of pixels;

a processor configured to:
modulate the electrical signals applied or received by each of the second plurality of lines according to a first pattern;
demodulate the modulated electrical signals applied or received by the second plurality of lines according to a second pattern, thereby determining a first set of relative values for the first pixel group, the first set of relative values comprising a first relative value corresponding to a first pixel and a second relative value corresponding to a second pixel,
determine a first absolute value corresponding to the first pixel; and
based on the determined first absolute value, the first relative value, and/or the second relative value, determine a second absolute value corresponding to the second pixel.

20. The system of claim 19, wherein determining the first absolute value comprises:
modulating electrical signals applied or received by each line of a third plurality of lines according to a third pattern, the third plurality of lines comprising a first line and a second line, wherein the first line of the second plurality of lines is the same line as the first line of the third plurality of lines, a set of the intersections between the first plurality of lines and the third plurality of lines defining a second pixel group comprising a plurality of pixels;
demodulating the modulated electrical signals applied or received by the second plurality of lines according to a fourth pattern, thereby determining a set of absolute values, the set of absolute values comprising the first absolute value.

21. The system of claim 20, wherein the third pattern comprises m time slots, wherein for at least one of the m timeslots, an array of modulation factors corresponding to the at least one timeslot sums to value that is not substantially zero.

22. The system of claim 19, wherein the first pattern comprises n timeslots, wherein for each of the n timeslots, an array of modulation factors corresponding to the respective timeslot sums to substantially zero.

23. The system of claim 19, wherein an electrical isolator is disposed at a position proximate the first pixel, the isolator being arranged to electrically isolate a line of the first plurality of lines from a line of the second plurality of lines.

24. A system for detecting a user's finger or other element, the system comprising:
a first plurality of pixels, the first plurality of pixels comprising a first pixel and a second pixel;
a second plurality of pixels, the second plurality of pixels comprising a first pixel and a second pixel;
a processor configured to:
determine a first set of relative values corresponding to the first plurality of pixels;
determine a second set of relative values corresponding to the second plurality of pixels;
compare a first value from the first set of relative values to a second value from the second set of relative values;
based on the comparing step, determine a first offset value indicating a difference between the first set of relative values and the second set of relative values;
based on the determined first offset value, compensate for the difference between the first set of relative values and the second set of relative values.

25. The system of claim 24, wherein the comparing step is performed under conditions whereby a difference between the first value and the second value is expected to be approximately zero in the absence of a nonzero first offset value.

* * * * *